(12) United States Patent
Chang et al.

(10) Patent No.: US 12,219,639 B2
(45) Date of Patent: Feb. 4, 2025

(54) COMMUNICATION METHOD AND APPARATUS

(71) Applicant: Huawei Technologies Co., Ltd., Guangdong (CN)

(72) Inventors: Junren Chang, Beijing (CN); Jifeng Li, Shanghai (CN); Shulan Feng, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 351 days.

(21) Appl. No.: 17/573,416

(22) Filed: Jan. 11, 2022

(65) Prior Publication Data

US 2022/0132613 A1 Apr. 28, 2022

Related U.S. Application Data

(63) Continuation of application No. PCT/CN2020/099912, filed on Jul. 2, 2020.

(30) Foreign Application Priority Data

Jul. 12, 2019 (CN) .................. 201910631842.X

(51) Int. Cl.
*H04W 76/16* (2018.01)
*H04L 5/14* (2006.01)
(Continued)

(52) U.S. Cl.
CPC ........... *H04W 76/16* (2018.02); *H04L 5/1469* (2013.01); *H04W 72/1263* (2013.01); *H04W 72/542* (2023.01); *H04W 74/0833* (2013.01)

(58) Field of Classification Search
CPC . H04W 72/21; H04W 72/11; H04W 72/1226; H04W 72/1215; H04W 28/10;
(Continued)

(56) References Cited

U.S. PATENT DOCUMENTS

2012/0264390 A1 10/2012 Clevorn et al.
2016/0135213 A1 5/2016 Zhu et al.
(Continued)

FOREIGN PATENT DOCUMENTS

CN 101222715 A 7/2008
CN 101827464 A 9/2010
(Continued)

OTHER PUBLICATIONS

3GPP TR 22.834 V1.0.0 (May 2019), 3rd Generation Partnership Project; Technical Specification Group Services and System Aspects; Study on Support for Multi-USIM Devices (Release 17), 17 pages.
(Continued)

*Primary Examiner* — Iqbal Zaidi
(74) *Attorney, Agent, or Firm* — WOMBLE BOND DICKINSON (US) LLP

(57) ABSTRACT

This application relates to the field of communication technologies, and discloses a communication method and apparatus. The method includes: After registering with a first network and a second network, a terminal device may send first information to a network device in the first network or a network device in the second network, so that the network device in the first network or the network device in the second network can learn that the terminal device is to enter a first transmission manner or has entered the first transmission manner. The first transmission manner includes: The terminal device concurrently processes an uplink service of the first network and an uplink service of the second network.

16 Claims, 9 Drawing Sheets

(51) Int. Cl.
*H04W 72/1263* (2023.01)
*H04W 72/542* (2023.01)
*H04W 74/0833* (2024.01)

(58) Field of Classification Search
CPC ..... H04W 8/245; H04W 8/183; H04W 72/56; H04B 7/0626; H04L 1/1812; H04L 12/2801
See application file for complete search history.

(56) References Cited

U.S. PATENT DOCUMENTS

| | | | |
|---|---|---|---|
| 2016/0174187 A1 | 6/2016 | Gopala Krishnan et al. | |
| 2018/0077728 A1 | 3/2018 | Shi et al. | |
| 2018/0160422 A1 | 6/2018 | Pathak et al. | |
| 2019/0082446 A1 | 3/2019 | Guo et al. | |
| 2019/0334663 A1* | 10/2019 | Dev | H04L 1/1874 |
| 2021/0345432 A1* | 11/2021 | Yang | H04W 76/19 |
| 2023/0396992 A1* | 12/2023 | Jiang | H04W 72/23 |

FOREIGN PATENT DOCUMENTS

| | | |
|---|---|---|
| CN | 101990319 A | 3/2011 |
| CN | 102065541 A | 5/2011 |
| CN | 104066066 A | 9/2014 |
| CN | 104396330 A | 3/2015 |
| CN | 105359611 A | 2/2016 |
| CN | 105682252 A | 6/2016 |
| CN | 105978582 A | 9/2016 |
| CN | 106537951 A | 3/2017 |
| CN | 106792628 A | 5/2017 |
| CN | 108419290 A | 8/2018 |
| CN | 109314736 A | 2/2019 |
| CN | 109891933 A | 6/2019 |
| EP | 2662990 A2 | 11/2013 |
| EP | 3111611 A1 | 1/2017 |
| WO | 2015124579 A1 | 8/2015 |
| WO | 2015180134 A1 | 12/2015 |
| WO | 2017012532 A1 | 1/2017 |
| WO | 2018063651 A1 | 4/2018 |
| WO | 2018125533 A1 | 7/2018 |
| WO | 2018141081 A1 | 8/2018 |
| WO | 2018226294 A1 | 12/2018 |

OTHER PUBLICATIONS

Tdoc RP-111637, Ericsson, Dual-SIM Dual-Standby UEs and their impact on the RAN, 3GPP TSG-RAN#54, Berlin, Germany, Dec. 6-9, 2011, total 3 pages.

Zhao Jian-chuan et al., Study on the mastercard suspending slave card in dual card dual standby terminal, 2016, 6 pages.

* cited by examiner

COMMUNICATION METHOD AND APPARATUS

CROSS-REFERENCE TO RELATED APPLICATIONS

This application is a continuation of International Application No. PCT/CN2020/099912, filed on Jul. 2, 2020, which claims priority to Chinese Patent Application No. 201910631842.X, filed on Jul. 12, 2019. The disclosures of the aforementioned applications are hereby incorporated by reference in their entireties.

TECHNICAL FIELD

This application relates to the field of communication technologies, and in particular, to a communication method and apparatus.

BACKGROUND

With the development of communication technologies, many terminal devices (such as mobile phones) have a dual subscriber identity module (SIM) dual standby function. Dual SIM dual standby means that two subscriber identity module cards are installed in a mobile phone, and the two SIM cards can both be in a standby mode and connected to a network.

Dual SIM dual standby (DSDS) single active is a common dual SIM dual standby solution. One set of transmit and receive radio frequencies is configured in a DSDS mobile phone. When the mobile phone is in a standby mode, two SIM cards can asynchronously monitor paging. However, because only one set of transmit and receive radio frequencies is configured in the DSDS mobile phone, for the DSDS mobile phone, only dual card dual standby can be implemented, but the two cards cannot perform communication simultaneously. For example, when one SIM card uses the transmit and receive radio frequencies to transmit voice data, because the SIM card occupies all radio frequency resources, the other SIM card cannot receive a paging (paging) request due to a lack of radio frequency resources, causing a failure in answering a call.

To implement dual SIM dual standby dual active of a mobile phone, a dual SIM dual active (DSDA) technology is used in the mobile phone. Two sets of transmit and receive radio frequencies are configured in a DSDA mobile phone. In other words, each SIM has one independent set of transmit and receive radio frequencies. In this way, even if one SIM card uses one set of transceiver radio frequencies to transmit voice data, the other SIM card can use the other set of transceiver radio frequencies to receive a paging message and answer a call. However, costs of configuring two sets of transmit and receive radio frequencies in the DSDA mobile phone are high, and configuring two sets of transmit and receive radio frequencies occupies a large layout area and increases a volume of the mobile phone.

Currently, a mobile phone supporting dual receive single transmit—DSDS (DR-DSDS) is provided. Compared with the DSDA mobile phone, the DR-DSDS mobile phone is configured with only one radio frequency transmit (Tx) channel and two radio frequency receive (Rx) channels. Therefore, costs of the mobile phone can be reduced, and a radio frequency circuit layout area can be reduced. However, because only one radio frequency transmit (Tx) channel is configured in the mobile phone supporting dual receive single transmit, how to implement effective communication between the mobile phone and a network device still needs to be further researched.

SUMMARY

In view of this, this application provides a communication method and apparatus, to implement effective communication between a terminal device supporting dual receive single transmit and a network device.

According to a first aspect, an embodiment of this application provides a communication method. The method includes:

A communication device registers with a first network and a second network, and sends first information to a network device, where the first information is used to indicate that the communication device is to enter a first transmission manner or has entered the first transmission manner; and the network device may be a network device in the first network or a network device in the second network. The first transmission manner includes: The communication device concurrently processes an uplink service of the first network and an uplink service of the second network.

The communication device described in this embodiment of this application may be a terminal device. According to the foregoing method, the terminal device sends the first indication information to the network device in the first network and/or the network device in the second network, so that the network device in the first network and/or the network device in the second network can learn that the terminal device is to enter the first transmission manner or has entered the first transmission manner. Therefore, a scheduling policy can be optimized accordingly, and effective communication between the network device and the terminal device can be implemented. In addition, this implementation is simple and convenient.

In one embodiment, the communication device described in this embodiment of this application may be the terminal device.

In one embodiment, that the communication device sends the first information to the network device includes: When processing a communication service of the first network, the communication device sends the first information to the network device in the first network if a first condition is satisfied.

That the first condition is satisfied includes at least one of the following:
  the communication device determines that a radio resource control RRC connection needs to be established in the second network;
  the communication device determines that a location domain needs to be updated in the second network;
  the communication device determines that an emergency call needs to be initiated in the second network;
  the communication device determines that an on-demand system information request needs to be executed in the second network; or
  the communication device determines that random access needs to be performed in the second network.

In one embodiment, the network device is the network device in the first network, and the first information includes at least one of the following:
  information about a timing offset between the first network and the second network;
  time division duplex TDD configuration information of the second network;

first resource information and/or second resource information;

quality of service QoS information of the uplink service of the second network;

configuration information used by the network device in the second network to perform semi-persistent scheduling on the communication device;

indication information indicating that the network device in the second network performs dynamic scheduling on the communication device;

information about a reason why the communication device accesses the second network; or information about a reason why the communication device enters the first transmission manner.

The first resource information is used to indicate an available time unit in which the network device in the first network schedules the communication device, and the second resource information is used to indicate an available time unit in which the network device in the second network schedules the communication device.

In one embodiment, the network device is the network device in the first network, and the method further includes: The communication device sends second information to the network device in the first network, where the second information includes third resource information, and the third resource information is used to indicate random access resources of the network device in the second network, and/or is used to indicate a part of the random access resources selected by the communication device from the random access resources.

According to the foregoing method, the terminal device may send first assistance information to the network device in the first network, so that after the terminal device enters the first transmission manner, the network device in the first network may schedule the terminal device based on the first assistance information. Therefore, it can be effectively ensured that the terminal device obtains proper transmission opportunities in both the first network and the second network, to avoid an uplink scheduling conflict between the first network and the second network, and improve user experience.

In one embodiment, the method further includes: The communication device receives third information sent by the network device in the first network, where the third information is used to indicate a first time unit in which the network device in the first network does not perform scheduling; and the first time unit includes all or some time units corresponding to the random access resources, or the first time unit includes all or some time units corresponding to the part of the random access resources; and the communication device sends a random access request to the network device in the second network in the first time unit.

In one embodiment, the network device is the network device in the first network, and the method further includes: The communication device sends fourth information to the network device in the first network, where the fourth information includes fourth resource information, and the fourth resource information is used to indicate a resource that is used to transmit a random access message 3 and that is obtained by the communication device from the network device in the second network.

In one embodiment, the method further includes: The communication device receives fifth information sent by the network device in the first network, where the fifth information is used to indicate a second time unit in which the network device in the first network does not perform scheduling, and the second time unit includes all or some time units corresponding to the resource that is used to transmit the random access message 3; and the communication device sends the random access message 3 to the network device in the second network in the second time unit.

In one embodiment, the network device is the network device in the second network. That the communication device sends the first information to the network device includes: The communication device sends the random access message 3 to the network device in the second network, where the random access message 3 includes the first information; or after successfully accessing the network device in the second network, the communication device sends the first information to the network device in the second network.

In one embodiment, the first information includes at least one of the following:

the information about the timing offset between the first network and the second network;

time division duplex TDD configuration information of the first network;

the first resource information and/or the second resource information;

quality of service QoS information of the uplink service of the first network;

configuration information used by the network device in the first network to perform semi-persistent scheduling on the communication device;

indication information indicating that the network device in the first network performs dynamic scheduling on the communication device;

the information about the reason why the communication device enters the first transmission manner.

The first resource information is used to indicate the available time unit in which the network device in the first network schedules the communication device, and the second resource information is used to indicate the available time unit in which the network device in the second network schedules the communication device.

According to the foregoing method, the terminal device may send the first assistance information to the network device in the second network, so that after the terminal device enters the first transmission manner, the network device in the second network may schedule the terminal device based on the first assistance information. Therefore, it can be effectively ensured that the terminal device obtains the proper transmission opportunities in both the first network and the second network, to avoid the uplink scheduling conflict between the first network and the second network, and improve user experience.

In one embodiment, that the communication device concurrently processes an uplink service of the first network and an uplink service of the second network includes: The communication device concurrently processes the uplink service of the first network and the uplink service of the second network in time domain.

According to a second aspect, an embodiment of this application provides a communication method. The method includes:

A network device receives first information sent by a communication device, where the first information is used to indicate that the communication device is to enter a first transmission manner or has entered the first transmission manner; and the network device enters a second transmission manner corresponding to the first transmission manner, where the first transmission manner includes: The communication device concurrently processes an uplink service of a first network and an uplink service of a second network;

and the network device is a network device in the first network or a network device in the second network.

According to the foregoing method, the network device in the first network and/or the network device in the second network can learn, based on the first information, that a terminal device is to enter the first transmission manner or has entered the first transmission manner. Therefore, a scheduling policy can be optimized accordingly, and effective communication between the network device and the terminal device can be implemented. In addition, this implementation is simple and convenient.

In one embodiment, that the network device enters a second transmission manner includes:

The network device updates a bit error rate threshold of uplink transmission of the communication device from a first value to a second value, where the second value is greater than the first value.

In this way, after learning that the terminal device enters the first transmission manner, the network device can update the bit error rate threshold, to improve tolerance of a bit error rate of uplink transmission, and avoid a waste of network resources.

In one embodiment, the network device is the network device in the first network, and the first information includes at least one of the following:
- information about a timing offset between the first network and the second network;
- TDD configuration information of the second network;
- first resource information and/or second resource information;
- QoS information of the uplink service of the second network;
- configuration information used by the network device in the second network to perform semi-persistent scheduling on the communication device;
- indication information indicating that the network device in the second network performs dynamic scheduling on the communication device;
- information about a reason why the communication device accesses the second network; or
- information about a reason why the communication device enters the first transmission manner.

The first resource information is used to indicate an available time unit in which the network device in the first network schedules the communication device, and the second resource information is used to indicate an available time unit in which the network device in the second network schedules the communication device.

In one embodiment, the network device is the network device in the first network, and the method further includes: The network device in the first network receives second information sent by the communication device, where the second information includes third resource information, and the third resource information is used to indicate random access resources of the network device in the second network, and/or the third resource information is used to indicate a part of the random access resources selected by the communication device from the random access resources; and the network device in the first network sends third information to the communication device, where the third information is used to indicate a first time unit in which the network device in the first network does not perform scheduling; and the first time unit includes all or some time units corresponding to the random access resources, or the first time unit includes all or some time units corresponding to the part of the random access resources.

In one embodiment, the network device is the network device in the first network, and the method further includes: The network device in the first network receives fourth information sent by the communication device, where the fourth information includes fourth resource information, and the fourth resource information is used to indicate a resource that is used to transmit a random access message 3 and that is obtained by the communication device from the network device in the second network; and the network device in the first network sends fifth information to the communication device, where the fifth information is used to indicate a second time unit in which the network device in the first network does not perform scheduling, and the second time unit includes all or some time units corresponding to the resource that is used to transmit the random access message 3.

In one embodiment, the network device is the network device in the second network, and that a network device receives first information sent by a communication device includes: The network device in the second network receives the random access message 3 sent by the communication device, where the random access message 3 includes the first information; or after the communication device successfully accesses the network device in the second network, the network device in the second network receives the first information sent by the communication device.

In one embodiment, the first information includes at least one of the following:
- the information about the timing offset between the first network and the second network;
- time division duplex TDD configuration information of the first network;
- the first resource information and/or the second resource information;
- quality of service QoS information of the uplink service of the first network; configuration information used by the network device in the first network to perform semi-persistent scheduling on the communication device;
- indication information indicating that the network device in the first network performs dynamic scheduling on the communication device;
- the information about the reason why the communication device enters the first transmission manner.

The first resource information is used to indicate the available time unit in which the network device in the first network schedules the communication device, and the second resource information is used to indicate the available time unit in which the network device in the second network schedules the communication device.

In one embodiment, that the communication device concurrently processes an uplink service of a first network and an uplink service of a second network includes: The communication device concurrently processes the uplink service of the first network and the uplink service of the second network in time domain.

According to a third aspect, an embodiment of this application provides an apparatus. The apparatus may be a communication device (for example, a terminal device), or may be a semiconductor chip disposed in the terminal device. The apparatus has functions of implementing various possible designs in the first aspect. The functions may be implemented by hardware, or may be implemented by hardware executing corresponding software. The hardware or software includes one or more units or modules corresponding to the foregoing functions.

According to a fourth aspect, an embodiment of this application provides an apparatus. The apparatus may be a network device, or may be a semiconductor chip disposed in the network device. The apparatus has functions of implementing various possible designs in the second aspect. The functions may be implemented by hardware, or may be implemented by hardware executing corresponding software. The hardware or software includes one or more units or modules corresponding to the foregoing functions.

According to a fifth aspect, an embodiment of this application provides an apparatus, including a processor and a memory. The processor is configured to execute instructions stored in the memory. When the instructions are executed, the apparatus is enabled to perform the method according to any possible design of the first aspect.

According to a sixth aspect, an embodiment of this application provides an apparatus, including a processor and a memory. The processor is configured to execute instructions stored in the memory. When the instructions are executed, the apparatus is enabled to perform the method according to any possible design of the second aspect.

According to a seventh aspect, an embodiment of this application provides a communication system, where the communication system includes one or a combination of more of the foregoing terminal device and the network device.

According to an eighth aspect, an embodiment of this application further provides a computer-readable storage medium, including instructions. When the instructions are executed, the method according to any one of the foregoing aspects or the possible designs of the foregoing aspects is implemented.

According to a ninth aspect, an embodiment of this application further provides a computer program product, including a computer program or instructions. When the computer program or the instructions is/are executed, the method according to any one of the foregoing aspects or the possible designs of the foregoing aspects is implemented.

DESCRIPTION OF EMBODIMENTS

Figure 1A:
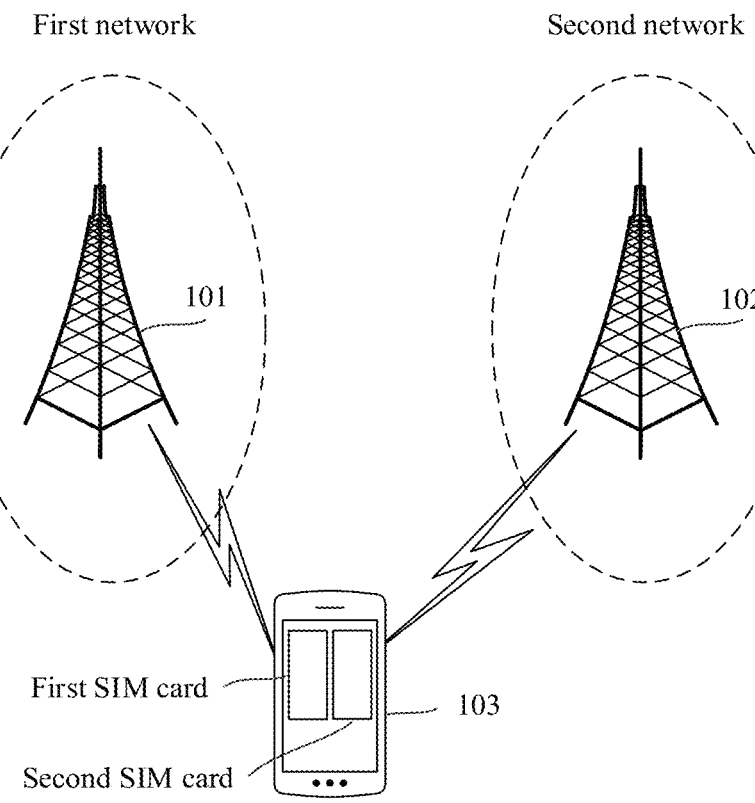
FIG. 1a is a schematic diagram of a communication system applicable to a communication method according to an embodiment of this application.

The following clearly and completely describes the technical solutions in the embodiments of this application with reference to the accompanying drawings in the embodiments of this application.

Some terms in the embodiments of this application are first described, to help a person skilled in the art have a better understanding.

(1) Terminal device: The terminal device is a device having a wireless transceiver function, and may be deployed on land, where the deployment includes indoor or outdoor, handheld, wearable, or in-vehicle deployment; may be deployed on water (for example, on a ship); or may be deployed in air (for example, on an airplane, a balloon, and a satellite). The terminal device may be a mobile phone, a tablet (Pad), a computer having a wireless transceiver function, a virtual reality (VR) terminal device, an augmented reality (AR) terminal device, a wireless terminal in industrial control, a wireless terminal in self-driving, a wireless terminal in telemedicine (telemedicine), a wireless terminal in a smart grid, a wireless terminal in transportation safety, a wireless terminal in a smart city, a wireless terminal in a smart home, or the like. An application scenario is not limited in the embodiments of this application. The terminal device may also be sometimes referred to as user equipment (UE), a mobile station, a remote station, and the like. A specific technology, a device form, and a name that are used by the terminal device are not limited in the embodiments of this application.

(2) Network device: The network device is an access device used by a terminal device to access the mobile communication system in a wireless manner, and may be a base station, an evolved NodeB (eNodeB), a transmission reception point (transmission reception point, TRP), a next generation NodeB (gNB) in a 5G mobile communication system, a base station in a future mobile communication system, or an access node in a wireless-fidelity (Wi-Fi) system; may be a module or a unit that implements some functions of a base station, for example, may be a central unit (CU); or may be a distributed unit (DU). A specific technology and a specific device form that are used by the network device are not limited in the embodiments of this application.

(3) The terms "system" and "network" may be interchangeably used in the embodiments of this application. "At least one" means one or more, and "a plurality of" means two or more. The term "and/or" describes an association relationship for describing associated objects and indicates that three relationships may exist. For example, A and/or B may indicate the following cases: Only A exists, both A and B exist, and only B exists, where A and B may be singular or plural. The character "I" generally indicates an "or" relationship between the associated objects. The term "at least one of the following items (pieces)" or a similar expression thereof means any combination of these items, including any combination of singular items (pieces) or plural items (pieces). For example, at least one item (piece)

of a, b, or c may indicate: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, first indication information and second indication information are merely intended to distinguish between different indication information, but do not indicate that the two types of indication information are different in content, priorities, sending sequences, importance, or the like.

The embodiments of this application may be applied to various communication systems, for example, a long term evolution (LTE) system, an advanced long term evolution (LTE-A) system, a fifth generation (5G) mobile communication technology, a new radio (NR) system, and a possible future communication system. This is not specifically limited.

For ease of understanding the embodiments of this application, a communication system shown in FIG. 1a is first used as an example to describe in detail a communication system applicable to the embodiments of this application. FIG. 1a is a schematic diagram of a communication system applicable to a communication method according to an embodiment of this application. As shown in FIG. 1a, a first network includes a network device 101, a second network includes a network device 102, and a terminal device 103 may register with the first network and the second network. For example, the terminal device 103 may have two user identities (for example, a first user identity and a second user identity), and the terminal device 103 may register with the first network by using the first user identity, and register with the second network by using the second user identity. Alternatively, it may be understood that the terminal device 103 includes two users (for example, a first user and a second user), the first user of the terminal device 103 registers with the first network, and the second user registers with the second network.

It should be noted that (1) in FIG. 1a, only an example in which the terminal device has two user identities and registers with two networks is used. In another possible embodiment, the terminal device may alternatively have more than two user identities and may register with more than two networks. This embodiment of this application is mainly described on the basis that the terminal device has two user identities and registers with two networks. When the terminal device has more than two user identities and registers with more than two networks, for a specific implementation, refer to related descriptions in which the terminal device has two user identities and registers with two networks.

(2) In this embodiment of this application, a "user" (for example, the first user or the second user) is a logical concept. The "user" may correspond to a SIM card, subscriber information, a virtual SIM card, or a subscriber identity (for example, an international mobile subscriber identity (IMSI)/a temporary mobile subscriber identity (TMSI)), but is not limited to a natural person user or a physical terminal (a mobile phone), or the like. From the perspective of a network side, different "users" logically correspond to different communication entities served by a network side. For example, a terminal having a dual registration function is equivalent to two communication entities for the network side. For another example, when the "user" corresponds to the SIM card or the subscriber information, the network side identifies two terminals having different SIM cards or different subscriber information as two different communication entities, or identifies a same terminal device having a plurality of different SIM cards or a plurality of pieces of subscriber information as a plurality of different communication entities, even though actually, the terminal having the plurality of different SIM cards or the plurality of pieces of subscriber information is only one physical entity. This embodiment of this application is mainly described by using an example in which the "user" corresponds to the SIM card.

Figure 1B:
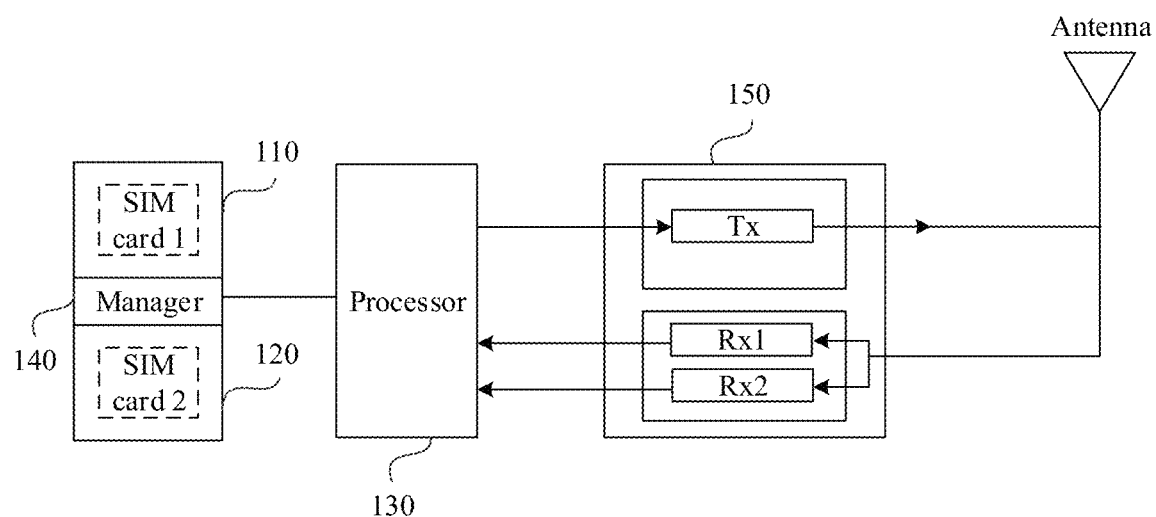
FIG. 1b is a schematic diagram of a structure of a terminal device according to an embodiment of this application.

FIG. 1b is a schematic diagram of a structure of a terminal device according to an embodiment of this application. The terminal device may be the terminal device 103 shown in FIG. 1a. As shown in FIG. 1b, the terminal device 103 may include a first SIM card interface 110, a second SIM card interface 120, a manager 140 coupled to the first SIM card interface 110 and the second SIM card interface 120, a processor 130 coupled to the manager 140, and a transceiver 150 connected to the processor 130. The processor 130 may be a baseband processor (BBP). As shown in FIG. 1b, the transceiver 150 includes a radio frequency Rx1 channel, a radio frequency Rx2 channel, and a radio frequency Tx channel. The first SIM card interface 110 is configured to install a SIM card 1, and the second SIM card interface 120 is configured to install a SIM card 2. The manager 140 may send an uplink data packet related to a service of the SIM card 1 to the processor 130, or send an uplink data packet related to a service of the SIM card 2. Correspondingly, the processor 130 may send the uplink data packet related to the service of the SIM card 1 on the radio frequency Tx channel, or send the uplink data packet related to the service of the SIM card 2.

For example, the terminal device 103 may be a terminal device that can support network standards of a plurality of operators, that is, the terminal device 103 can support networks of the plurality of operators (for example, two or all of China Unicom, China Mobile, and China Telecom). The first SIM card is used as an example. The terminal device 103 may determine, by obtaining an identifier of the first SIM card, an operator to which the first SIM card belongs, and further register the first SIM card with a network of the corresponding operator. After registering with the network of the corresponding operator, the first SIM card may access a network device (for example, the network device 101) in the network of the corresponding operator through a random access process, and further send the uplink data packet of the service to the network device 101. The second SIM card is used as an example. The terminal device 103 may determine, by obtaining an identifier of the second SIM card, an operator to which the second SIM card belongs, and further register the second SIM card with a network of the corresponding operator. After registering with the network of the corresponding operator, the second SIM card may access a network device (for example, the network device 102) in the network of the corresponding operator through a random access process, and further send the uplink data packet of the service to the network device 102.

In this embodiment of this application, the radio frequency Tx channel may also be referred to as a Tx radio frequency resource or a transmitter, and the radio frequency Rx channel may also be referred to as an Rx radio frequency resource or a receiver. This is not specifically limited.

For the terminal device shown in FIG. 1a and FIG. 1b, because the terminal device has only one radio frequency Tx channel, when sending the uplink data packet related to the service of the SIM card 1, the terminal device cannot send the uplink data packet related to the service of the SIM card 2. However, in some possible scenarios, for example, the terminal device is performing a voice service (for example, making a hotline call of a bank A) of the first SIM card, and simultaneously needs to open an application (APP) of the bank A by using the second SIM card to perform some operations. In other words, the terminal device needs to send both the uplink data packet related to the service of the SIM card 1 and the uplink data packet related to the service of the SIM card 2 in a time period. For this scenario, a possible solution is that the terminal device asynchronously sends the uplink data packet related to the service of the SIM card 1 and the uplink data packet related to the service of the SIM card 2 in the time period. For example, in a time period (where the time period includes a subframe 1 to a subframe 5), the terminal device may send the uplink data packet related to the service of the first SIM card in the subframe 1, the subframe 2, and the subframe 3, and send the uplink data packet related to the service of the second SIM card in the subframe 4 and the subframe 5. Generally, one subframe is 1 ms, one subframe may include a plurality of slots, and one slot may include a plurality of smaller time units, for example, symbols.

However, the foregoing solution coordinately processes communication requirements of the first SIM card and the second SIM card only from the perspective of the terminal device, but a network device that communicates with the terminal device is not aware of this. This may cause a series of problems. For example, the network device 101 and the network device 102 may simultaneously schedule an uplink time domain resource of the terminal device, resulting in a high bit error rate of uplink transmission of the terminal device due to a scheduling conflict. However, the network device (for example, the network device 101) is not aware of the scheduling conflict, and may consider that the high bit error rate of the terminal device is caused by another reason (for example, a channel environment). As a result, transmit power is increased, and a waste of network resources is caused.

Based on this, the embodiments of this application mainly study communication between a terminal device that supports dual receive single transmit and the network device.

The following describes in detail a communication method provided in the embodiments of this application.

In an embodiment of this application, a terminal device may register with a first network and a second network, and send first information to a network device in the first network or a network device in the second network. The first information may be understood as first indication information, and is used to indicate that the terminal device is to enter a first transmission manner or has entered the first transmission manner; or the first information may include first indication information and first assistance information; or the first information includes first assistance information.

For example, the communication method provided in this embodiment of this application may include three possible solutions: a solution 1, a solution 2, and a solution 3. In the solution 1, the terminal device sends the first indication information to the network device in the first network and/or the network device in the second network, where the first indication information is used to indicate that the terminal device is to enter the first transmission manner or has entered the first transmission manner. In other words, the terminal device may notify the first network and/or the second network that the terminal device is to enter the first transmission manner or has entered the first transmission manner, so that the network device in the first network and/or the network device in the second network can learn, based on the first indication information, that the terminal device is to enter the first transmission manner or has entered the first transmission manner. In this way, the terminal device is more effectively scheduled, and effective communication between the terminal device and the network device is implemented. In the solution 2, the terminal device may send the first assistance information to the network device in the first network. In this way, after the terminal device enters the first transmission manner, the network device in the first network can schedule the terminal device based on the first assistance information. Therefore, scheduling effectiveness can be improved, and effective communication between the terminal device and the network device can be implemented. In the solution 3, the terminal device may send second assistance information to the network device in the first network, where the second assistance information is used by the network device in the first network to assist the terminal device in randomly accessing the second network. Therefore, it can be ensured that the terminal device can succeed in randomly accessing the second network, and effective communication between the terminal device and the network device can be implemented.

For example, the first transmission manner in this embodiment of this application may include: The terminal device concurrently processes an uplink service of the first network and an uplink service of the second network. That the terminal device concurrently processes an uplink service of the first network and an uplink service of the second network may be understood as that the terminal device concurrently processes the uplink service of the first network and the uplink service of the second network in time domain, or the terminal device asynchronously processes the uplink service of the first network and the uplink service of the second network.

That the terminal device processes the uplink service of the first network may be understood as that the terminal device sends an uplink data packet related to a service of a first SIM card to the network device in the first network. Similarly, that the terminal device processes the uplink service of the second network may be understood as that the terminal device sends an uplink data packet related to a service of a second SIM card to the network device in the second network. Correspondingly, that the terminal device concurrently processes the uplink service of the first network and the uplink service of the second network in time domain may be understood as that the terminal device sends the uplink data packet related to the service of the first SIM card to the network device in the first network, and sends the uplink data packet related to the service of the second SIM card to the network device in the second network by using different time domain resources. For example, the terminal device sends the uplink data packet related to the service of the first SIM card to the network device in the first network in a subframe 1, a subframe 2, and a subframe 3, and sends the uplink data packet related to the service of the second SIM card to the network device in the second network in a subframe 4 and a subframe 5.

It should be noted that the first transmission manner in this embodiment of this application may also be referred to as a dual SIM concurrent manner, a dual SIM concurrent mode, or another possible name. This is not specifically limited.

Figure 2:
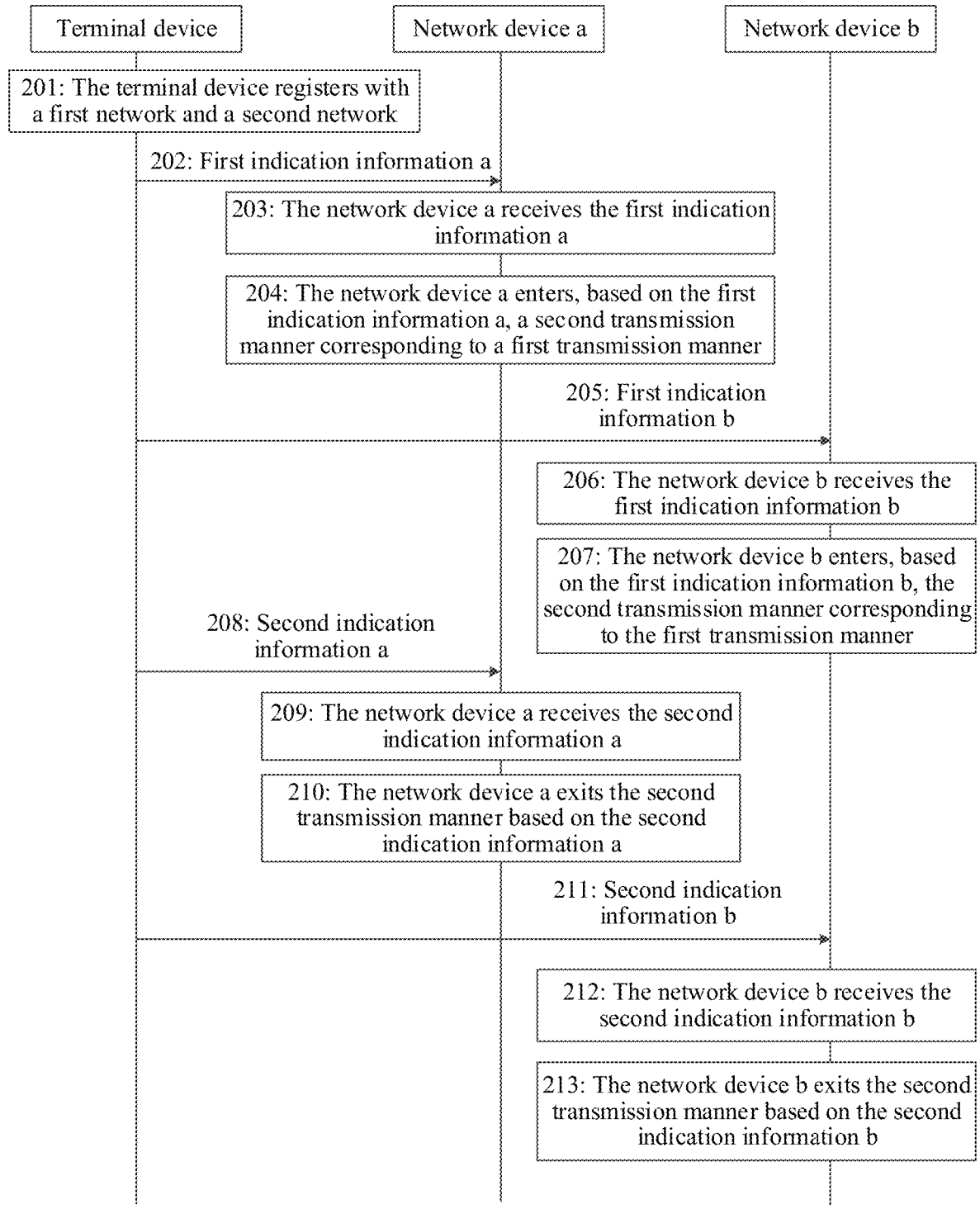
FIG. 2 is a schematic flowchart corresponding to a communication method according to an embodiment of this application.

Based on the solution 1, FIG. 2 is a schematic flowchart corresponding to a communication method according to an embodiment of this application. As shown in FIG. 2, the method includes the following operations.

Operation 201: A terminal device registers with a first network and a second network.

For example, the terminal device may include a first SIM card and a second SIM card, and networks of operators to which the first SIM card and the second SIM card belong may be the same or different. For example, networks of operators to which the first SIM card and the second SIM card belong are different (where the networks are the first network and the second network). The first SIM card may register with the first network, and the second SIM card may register with the second network.

Further, after registering with the first network, the first SIM card may access a network device in the first network, for example, access a network device a in the first network through a random access process. Similarly, after registering with the second network, the second SIM card may access a network device in the second network, for example, access a network device b in the second network through a random access process.

In this embodiment of this application, that a terminal device registers with a first network and a second network may be understood as that the terminal device has registered with the first network and the second network (that is, the terminal device has completed registration in the first network and the second network), or the terminal has registered with the first network, and is registering with the second network.

Operation 202: The terminal device sends first indication information to the network device (referred to as the network device a below for ease of description) in the first network, where the first indication information is used to indicate that the terminal device is to enter or has entered a first transmission manner. For ease of differentiation, in the following descriptions, the first indication information sent by the terminal device to the network device a is referred to as first indication information a, and first indication information sent by the terminal device to the network device (referred to as the network device b) in the second network is referred to as first indication information b.

Correspondingly, in operation 203, the network device a receives the first indication information a.

In a possible example, the first indication information a may be a message sent by the terminal device to the network device a. The message may be a newly added message specially used to indicate that the terminal device is to enter or has entered the first transmission manner. A name of the message is not limited. In another possible example, the first indication information a may be information carried in a message sent by the terminal device to the network device a, the message may be an existing message, and the first indication information a may be a newly added information element in the message. For example, the first indication information a may include one bit. When a value of the bit may be "1", it indicates that the terminal device is to enter or has entered the first transmission manner.

In this embodiment of this application, when processing a communication service of the first network, the terminal device may send the first indication information a to the network device a if a first condition is satisfied. That the first condition is satisfied includes at least one of the following: (1) The terminal device determines that an RRC connection needs to be established in the second network. (2) The terminal device determines that a location domain needs to be updated in the second network. (3) The terminal device determines that an emergency call needs to be initiated in the second network. (4) The terminal device determines that an on-demand system information request needs to be executed in the second network. Herein, for example, in an NR system, to reduce load, system information (system information, SI) may no longer be completely broadcast, but may be classified into two types, namely, minimum system information (Minimum SI) (which can be understood as information necessary for normal running of a system) and other system information (Other SI). Some of the other SI is sent in an on-demand obtaining manner, so that when the terminal device needs to obtain some of the other SI, the terminal device may send the on-demand system information request to the network device. (5) The terminal device determines that random access needs to be performed in the second network. The five items listed herein are merely examples for description. In another possible embodiment, other possible content may be further included. This is not specifically limited.

Operation 204: The network device a enters, based on the first indication information a, a second transmission manner corresponding to the first transmission manner.

In a possible example, that the network device a enters a second transmission manner may include: The network device a increases tolerance of a bit error rate of uplink transmission of the terminal device. For example, the network device a updates a bit error rate threshold of the uplink transmission of the terminal device from a first value to a second value, where the second value is greater than the first value. In this embodiment of this application, after receiving uplink data sent by the terminal device, the network device a may calculate the bit error rate of the uplink transmission. If the bit error rate is greater than the bit error rate threshold, when scheduling the terminal device, the network device a quickly decreases a modulation and coding scheme (MCS) index and increases transmit power, to improve accuracy of data transmission.

For example, when the terminal device has not entered the first transmission manner, if time domain resources scheduled by the network device a include a subframe 1 to a subframe 5, the terminal device may send an uplink data packet to the network device a in the subframe 1 to the subframe 5. When the terminal device has entered the first transmission manner, if time domain resources scheduled by the network device a include a subframe 1 to a subframe 5, the terminal device sends an uplink data packet related to a service of the first SIM card to the network device a in the subframe 1, the subframe 2, and the subframe 3, and sends an uplink data packet related to a service of the second SIM card to the network device b in the subframe 4 and the subframe 5. From the perspective of the network device a, because the terminal device sends the uplink data packet to the network device a only in the subframe 1, the subframe 2, and the subframe 3, and does not send the uplink data packet to the network device a in the subframe 4 and the subframe 5, the network device a determines that the bit error rate of the uplink transmission of the terminal device is high and is greater than the bit error rate threshold (the first value). In this case, the network device a quickly decreases the modulation and coding scheme index and increases the transmit power. Actually, that the bit error rate of the uplink transmission of the terminal device is high is because the terminal device enters the first transmission manner, but is not caused by a channel environment or the like. In this case, decreasing the modulation and coding scheme index and increasing the transmit power by the network device a cause a waste of network resources. Therefore, in this embodiment of this application, after learning that the terminal device enters the first transmission manner, the network device a can update the bit error rate threshold, to improve the tolerance of the bit error rate of the uplink transmission, and avoid the waste of network resources.

In another possible example, that the network device a enters a second transmission manner may include: The network device a configures the terminal device to be in a preset mode, where the preset mode may be a mode preset for the first transmission manner, and the preset mode may correspond to a group of parameters, for example, a modulation and coding scheme and a quantity of retransmission times. For example, a value of the quantity of retransmission times in the preset mode is X, and a value of the quantity of retransmission times in a non-preset mode is Y. X may be greater than Y, to ensure effective data transmission after the terminal device enters the first transmission manner. In this embodiment of this application, specific values of the group of parameters corresponding to the preset mode may be set by a person skilled in the art according to an actual requirement and experience. In this way, the terminal device is configured to be in the preset mode, so that the network device a may subsequently schedule the terminal device based on the preset mode. This facilitates effective transmission between the network device a and the terminal device.

Operation 205: The terminal device sends the first indication information b to the network device b.

Correspondingly, in operation 206, the network device b receives the first indication information b.

Operation 207: The network device b enters, based on the first indication information b, the second transmission manner corresponding to the first transmission manner.

Herein, for implementations of operation 205 to operation 207, refer to the foregoing operation 202 to operation 204.

Operation 208: The terminal device sends second indication information to the network device a, where the second indication information is used to indicate that the terminal device is to exit or has exited the first transmission manner. For ease of differentiation, in the following descriptions, the second indication information sent by the terminal device to the network device a is referred to as second indication information a, and second indication information sent by the terminal device to the network device (referred to as the network device b) in the second network is referred to as second indication information b.

Correspondingly, in operation 209, the network device a receives the second indication information a.

In a possible example, the second indication information a may be a message sent by the terminal device to the network device a. The message may be a newly added message specially used to indicate that the terminal device is to exit or has exited the first transmission manner. A name of the message is not limited. In another possible example, the second indication information a may be information carried in a message sent by the terminal device to the network device a, the message may be an existing message, and the second indication information a may be a newly added information element in the message. For example, the second indication information a may include one bit. When a value of the bit may be "0", it indicates that the terminal device is to exit or has exited the first transmission manner.

In this embodiment of this application, there may be a plurality of conditions for triggering the terminal device to exit the first transmission manner: For example, an uplink service of the first network ends and/or an uplink service of the second network ends.

Operation 210: The network device a exits the second transmission manner based on the second indication information a.

In a possible example, that the network device a exits the second transmission manner may include: The network device a increases the tolerance of the bit error rate of the uplink transmission of the terminal device. For example, the network device a updates the bit error rate threshold of the uplink transmission of the terminal device from the second value to the first value. In another possible example, that the network device a exits the second transmission manner may include: The network device a configures the terminal device to be in the non-preset mode, or the network device a restores a configuration of the terminal device.

Operation 211: The terminal device sends the second indication information b to the network device b, where the second indication information b is used to indicate that the terminal device is to exit or has exited the first transmission manner.

Correspondingly, in operation 212, the network device b receives the second indication information b.

Operation 213: The network device b exits the second transmission manner based on the second indication information b.

Herein, for implementations of operation 211 to operation 213, refer to the foregoing operation 208 to operation 210.

It should be noted that operation numbers in FIG. 2 are merely numbered for ease of description, and do not constitute a limitation on an execution sequence of the operations. There is no strict execution sequence between operations that do not have a time sequence dependency relationship among the foregoing operations, and the sequence may be adjusted according to an actual situation. The operations in FIG. 2 are not necessary operations in an execution procedure. In specific implementations, the operations may be deleted according to an actual requirement. For example, operation 205 to operation 207 and operation 211 to operation 213 may not be performed.

According to the method in the solution 1, the terminal device sends the first indication information to the network device in the first network and/or the network device in the second network, so that the network device in the first network and/or the network device in the second network can learn that the terminal device is to enter the first transmission manner or has entered the first transmission manner. Therefore, a scheduling policy can be optimized accordingly, and effective communication between the network device and the terminal device can be implemented. In addition, this implementation is simple and convenient.

That is, in the solution 1, the terminal device performs rough assistance, and an indication is reported upon dual SIM activation. For example, when determining to enable a dual SIM concurrent mode, the terminal device reports simple indication information to a network, to notify the network that the terminal device enables the DSDS dual SIM concurrent mode. Correspondingly, after receiving the indication information reported by the terminal device, the network improves tolerance of an uplink bit error, or the network reconfigures the terminal device to be in the dual SIM concurrent mode. Further, after determining that a dual SIM service concurrent operation ends, the terminal device reports the indication information to the network, to indicate to cancel the dual SIM concurrent mode. Correspondingly, after receiving the indication information of the UE, the network performs reconfiguration. This solution is rough and simple. The network learns of a current special environment of the terminal device, and how the network specifically responds is left to network implementations. In this method, performance assurance greatly depends on optimization of the scheduling policy of the network.

Figure 3:
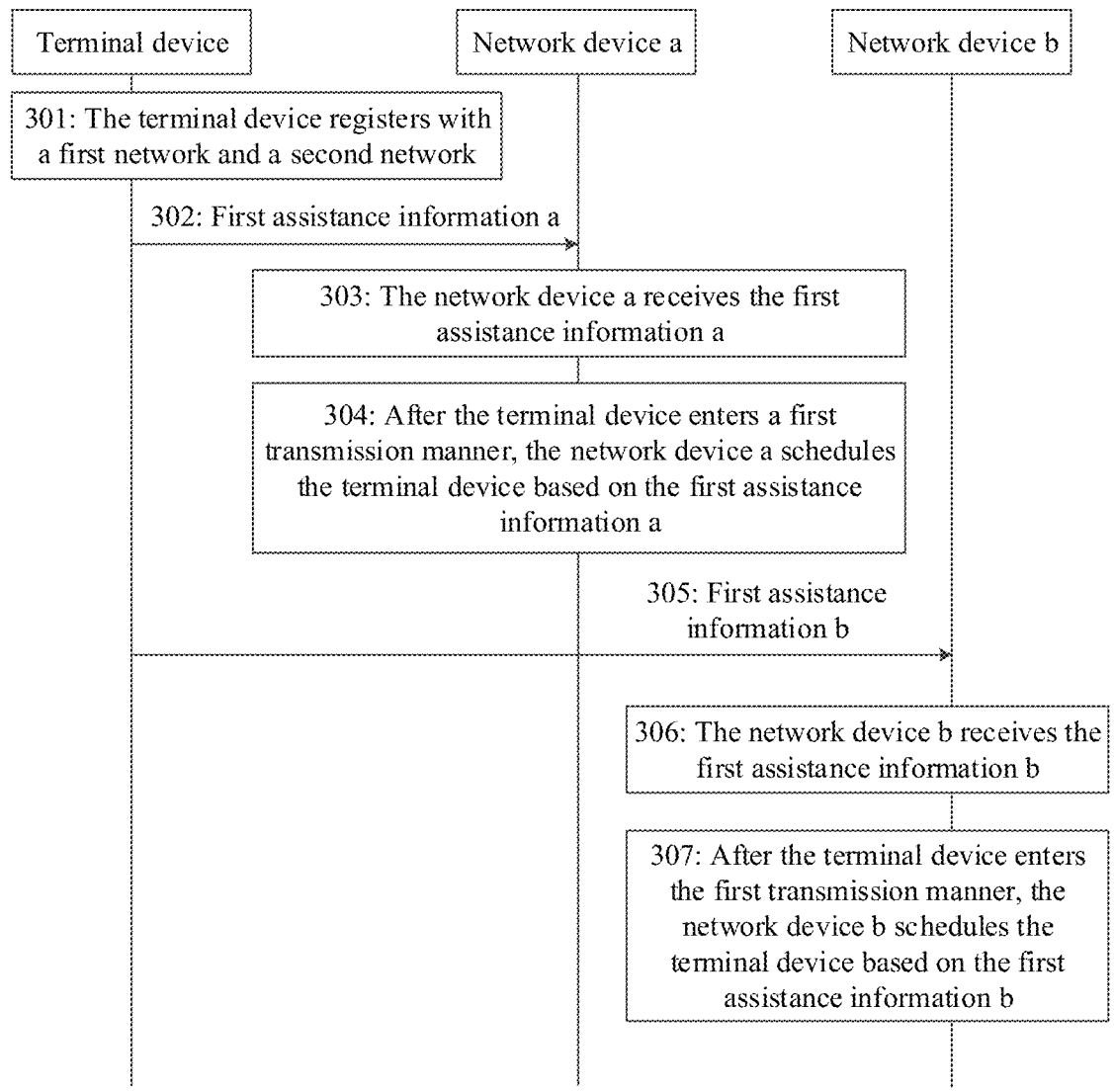
FIG. 3 is a schematic flowchart corresponding to another communication method according to an embodiment of this application.

Based on the solution 2, FIG. 3 is a schematic flowchart corresponding to a communication method according to an embodiment of this application. As shown in FIG. 3, the method includes the following operations.

Operation 301: A terminal device registers with a first network and a second network.

Operation 302: The terminal device sends first assistance information to a network device (referred to as a network device a for ease of description) in the first network. Content of the first assistance information sent by the terminal device to the network device a may be different from content of first assistance information sent by the terminal device to a network device (referred to as a network device b) in the second network. For ease of differentiation, in this embodiment of this application, the first assistance information sent by the terminal device to the network device a is referred to as first assistance information a, and the first assistance information sent by the terminal device to the network device b is referred to as first assistance information b.

Correspondingly, in operation 303, the network device a receives the first assistance information a.

Operation 304: After the terminal device enters a first transmission manner, the network device a schedules the terminal device based on the first assistance information a.

For example, the first assistance information a may be understood as assistance information that assists the network device a in scheduling the terminal device. For example, the first assistance information a may include at least one of the following: (1) information about a timing offset between the first network and the second network; (2) time division duplex (TDD) configuration information of the second network; (3) first resource information and/or second resource information; (4) configuration information used by the network device b to perform semi-persistent scheduling on the terminal device; (5) quality of service (QoS) information of an uplink service of the second network; (6) indication information indicating that the network device in the second network performs dynamic scheduling on the terminal device; (7) information about a reason why the terminal device accesses the second network; or (8) information about a reason why the terminal device enters the first transmission manner. The first resource information is used to indicate an available time unit in which the network device a schedules the terminal device, and the second resource information is used to indicate an available time unit in which the network device b schedules the terminal device.

The following describes content included in the first assistance information a.

(1) Information about the timing offset between the first network and the second network: In an example, after registering with the first network and the second network, the terminal device may actively measure the timing offset between the first network and the second network, to obtain the information about the timing offset between the first network and the second network. In another example, the network device indicates the terminal device to measure the timing offset between the first network and the second network. For example, the network device a sends one piece of indication information to the terminal device. After receiving the indication information, the terminal device may measure the timing offset between the first network and the second network, to obtain the information about the timing offset between the first network and the second network.

(2) The TDD configuration information of the second network may be an uplink/downlink (UL/DL) configuration of the second network. An LTE system is used as an example. As shown in Table 1, seven TDD UL/DL configurations are defined for TDD.

TABLE 1

| Configuration | UL/DL configuration | | | | | | | | | |
|---|---|---|---|---|---|---|---|---|---|---|
| | Subframe number | | | | | | | | | |
| number | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, "D" represents a downlink subframe, "U" represents an uplink subframe, and "S" represents a special subframe. It can be learned from Table 1 that, in the LTE TDD system, subframes in a radio frame may be classified into three types: the downlink subframe, the uplink subframe, and the special subframe. Each special subframe includes three parts: a Downlink Pilot Time Slot (DwPTS), which is a downlink transmission slot, a Guard Period, (GP), and an Uplink Pilot Time Slot (UpPTS), which is an uplink transmission slot.

In the LTE TDD system, uplink and downlink resource division is implemented by using a definition of a TDD frame structure. Therefore, a TDD frame structure may be configured for an LTE cell, and may be indicated to the terminal device by using system information broadcast in the cell.

For example, after receiving the TDD configuration information of the second network, the network device a may learn of the uplink and downlink resource division of the second network, to avoid an uplink scheduling conflict with the network device b.

(3) The first resource information and/or the second resource information may be determined by the terminal device. The terminal device may determine the first resource information and/or the second resource information based on a plurality of types of information, for example, the TDD configuration information of the first network and/or the second network. This is not specifically limited. For example, the first resource information indicates a subframe 1 to a subframe 4, and the second resource information indicates a subframe 5 to a subframe 8. That is, the network device a may schedule the subframe 1 to the subframe 4, and the network device b may schedule the subframe 5 to the subframe 8.

For example, if the network device a receives the first resource information (and the second resource information), the network device a may schedule a resource indicated by the first resource information, to avoid the uplink scheduling conflict with the network device b. Alternatively, if the network device a receives the second resource information, the network device a may schedule a resource other than the resource indicated by the second resource information, to avoid the uplink scheduling conflict with the network device b.

In this embodiment of this application, that the terminal device sends the first resource information and the second resource information to the network device a may be understood as that the terminal device sends a time division multiplexing (TDM) pattern (TDM pattern) to the network device a. For example, the TDM pattern may be that a slot 1 to a slot 4 are used by the network device a to schedule the terminal device, and a slot 5 to a slot 8 are used by the network device b to schedule the terminal device; or a slot 1 to a slot 4 are used for data transmission of a SIM card 1, and a slot 5 to a slot 8 are used for transmission of a SIM card 2.

(4) The configuration information used by the network device b to perform semi-persistent scheduling on the terminal device may include a semi-persistent scheduling periodicity, a start offset, and a specific resource location.

The semi-persistent scheduling may also be referred to as preconfigured scheduling or preconfigured grant transmission (preconfigured grant transmission). Preconfigured grant transmission may be classified into two types. Type 1 (Type 1) means that the network device configures the periodicity and the start offset and indicates the specific resource location by using radio resource control (RRC) signaling. That is, the network device may carry an uplink grant. Unless the terminal device receives a release command of the RRC signaling, it may be considered that a resource periodically appears. Type 2 means that the network device configures the periodicity and the start offset by using RRC signaling, and then performs activation and indicates the specific resource location by using DCI. Unless the terminal device receives a deactivation command, it may be considered that a resource indicated by the DCI periodically appears.

For example, after receiving the configuration information used by the network device b to perform semi-persistent scheduling on the terminal device, the network device a may more properly configure the semi-persistent scheduling or dynamic scheduling on the terminal device, to avoid the uplink scheduling conflict with the network device b.

It should be noted that if a type of scheduling performed on the terminal device by the network device b is the semi-persistent scheduling (for example, when the second SIM performs a voice service, the type of scheduling performed on the terminal device by the network device b may be the semi-persistent scheduling), the first assistance information a may include the semi-persistent scheduling information. If a type of scheduling performed on the terminal device by the network device b is not the semi-persistent scheduling, the first assistance information a may not include the semi-persistent scheduling information.

(5) The QoS information of the uplink service of the second network may include, for example, a delay requirement of the uplink service of the second network. This is not specifically limited.

For example, after receiving the QoS information of the uplink service of the second network, the network device a may consider the QoS information of the uplink service of the second network when scheduling the terminal device, to ensure normal processing of the uplink service of the second network.

(6) The indication information indicating that the network device (that is, the network device b) in the second network performs dynamic scheduling on the terminal device is used to indicate whether scheduling performed by the network device on the terminal device is the dynamic scheduling. For example, the indication information may include one bit. When a value of the bit is "0", it indicates that the scheduling performed by the network device on the terminal device is dynamic scheduling. When a value of the bit is "1", it indicates that the scheduling performed by the network device on the terminal device is not the dynamic scheduling.

For example, after receiving the indication information indicating that the network device b performs dynamic scheduling on the terminal device, the network device a may more properly configure the scheduling to be performed on the terminal device. For example, if scheduling performed by the network device b on the terminal device is the dynamic scheduling, because the dynamic scheduling is uncertain, to avoid a conflict, the network device a may not perform the semi-persistent scheduling on the terminal device.

(7) The information about the reason why the terminal device accesses the second network may be that, for example, a voice or data service needs to be performed in the second network, a location domain is updated in the second network, an emergency call is initiated in the second network, or an on-demand system information request is executed in the second network.

(8) The information about the reason why the terminal device enters the first transmission manner may be that, for example, an RRC connection needs to be established in the second network, a location domain needs to be updated in the second network, an emergency call needs to be initiated in the second network, an on-demand system information request needs to be executed in the second network, or random access needs to be performed in the second network.

In this embodiment of this application, the first assistance information a may include at least one of (1) to (8). For example, the first assistance information a may include (1) and (2), the first assistance information a may include (1) and (3), the first assistance information a may include (1) and (4), the first assistance information a may include (1), (2), and (5), the first assistance information a may include (1), (3), and (5), or the first assistance information a may include (1), (4), and (5).

In this embodiment of this application, there may be a plurality of implementations in which the terminal device sends the first assistance information a to the network device a.

In one embodiment (an embodiment 1), if determining to enter the first transmission manner, the terminal device sends the first assistance information a to the network device a. In an example of this implementation, the first assistance information a may implicitly indicate that the terminal device is to enter the first transmission manner or has entered the first transmission manner. In this way, after receiving the first assistance information a, the network device a may determine that the terminal device is to enter the first transmission manner or has entered the first transmission manner, and schedule the terminal device based on the first assistance information a. This implicit indication manner can effectively save transmission resources.

In another example of this embodiment, if determining to enter the first transmission manner at a first moment, the terminal device may send the first assistance information a to the network device in the first network in a time period corresponding to the first moment. The time period corresponding to the first moment is a time period including the first moment. For example, the first moment is the subframe 5, and the time period corresponding to the first moment may be a subframe 0 to the subframe 7. In other words, if determining to enter the first transmission manner at the first moment, the terminal device may report the first assistance information a in a short time period before or after the first moment. Further, the terminal device may send first indication information to the network device a, where the first indication information is used to indicate that the terminal device is to enter the first transmission manner or has entered the first transmission manner. Correspondingly, after receiving the first indication information, the network device may determine that the terminal device is to enter the first transmission manner or has entered the first transmission manner, and may further schedule the terminal device based on the received first assistance information a. In this case, the first assistance information a no longer implicitly indicates that the terminal device is to enter the first transmission manner or has entered the first transmission manner, but the first indication information is used to indicate that the terminal device is to enter the first transmission manner or has entered the first transmission manner.

In another embodiment (an embodiment 2), the terminal device sends, to the network device a, a third message used for random access, where the third message includes the first assistance information a. Alternatively, after successfully accessing the network device a, the terminal device sends the first assistance information a to the network device a. In an example of this implementation, the first assistance information a may implicitly indicate that the terminal device is to enter the first transmission manner or has entered the first transmission manner. In another example of this embodiment, the first assistance information a no longer implicitly indicates that the terminal device is to enter the first transmission manner or has entered the first transmission manner. The terminal device may further send first indication information to the network device a, where the first indication information is used to indicate that the terminal device is to enter the first transmission manner or has entered the first transmission manner. Correspondingly, after receiving the first indication information, the network device may determine that the terminal device is to enter the first transmission manner or has entered the first transmission manner, and may further schedule the terminal device based on the received first assistance information a.

It should be noted that (1) the embodiment 1 and the embodiment 2 are merely two possible examples. In a specific embodiment, another possible implementation may be used.

(2) It is assumed that the first assistance information a includes the information about the timing offset between the first network and the second network and the TDD configuration information of the second network. If the terminal device first randomly accesses the network device a and then randomly accesses the network device b, because the terminal device has not accessed the network device b when randomly accessing the network device a, the terminal device may have not obtained the TDD configuration information of the second network. In this case, after obtaining the TDD configuration information of the second network, the terminal device may send the first assistance information a to the network device a. For example, the terminal device may send the first assistance information a to the network device a by using the implementation 1. If the terminal device first randomly accesses the network device b and then randomly accesses the network device a, because the terminal device has obtained the TDD configuration information of the second network when randomly accessing the network device a, the terminal device may send the first assistance information a to the network device a by using the implementation 2.

Operation 305: The terminal device sends the first assistance information b to the network device (namely, the network device b) in the second network.

Correspondingly, in operation 306, the network device b receives the first assistance information b.

Operation 307: After the terminal device enters the first transmission manner, the network device b schedules the terminal device based on the first assistance information b.

For example, the first assistance information b may be understood as assistance information that assists the network device b in scheduling the terminal device. For example, the first assistance information b may include at least one of the following: (1) the information about the timing offset between the first network and the second network; (2) TDD configuration information of the first network; (3) the first resource information and/or the second resource information; (4) configuration information used by the network device a to perform semi-persistent scheduling on the terminal device; (5) quality of service (QoS) information of an uplink service of the first network; (6) indication information indicating that the network device in the first network performs dynamic scheduling on the terminal device; or (7) the information about the reason why the terminal device enters the first transmission manner. For explanations of content included in the first assistance information b, refer to the foregoing descriptions of the content included in the first assistance information a. For example, for an implementation in which the terminal device sends the first assistance information b to the network device b, refer to the foregoing implementation in which the terminal device sends the first assistance information a to the network device a. Details are not described again.

Herein, for implementations of operation 305 to operation 307, refer to the foregoing operation 302 to operation 304.

For example, for the foregoing operation procedure, if the terminal device first randomly accesses the network device a and then randomly accesses the network device b, in operation 302, the terminal device may send the first assistance information a to the network device a by using the implementation 1, and in operation 305, the terminal device may send the first assistance information b to the network device b by using the implementation 2.

It should be noted that operation numbers in FIG. 3 are merely numbered for ease of description, and do not constitute a limitation on an execution sequence of the operations. There is no strict execution sequence between operations that do not have a time sequence dependency relationship among the foregoing operations, and the sequence may be adjusted according to an actual situation. The operations in FIG. 3 are not necessary operations in an execution procedure. In specific implementations, the operations may be deleted according to an actual requirement. For example, operation 305 to operation 307 may not be performed.

According to the method in the solution 2, the terminal device may send the first assistance information a to the network device a and/or send the first assistance information b to the network device b, so that after the terminal device enters the first transmission manner, the network device a may schedule the terminal device based on the first assistance information a and/or the network device b may schedule the terminal device based on the first assistance information b. Therefore, it can be effectively ensured that the terminal device obtains proper transmission opportunities in both the first network and the second network, to avoid an uplink scheduling conflict between the first network and the second network, and improve user experience.

That is, in the solution 2, the terminal device reports the first assistance information to the network. For example, that the terminal device reports information about a timing offset between networks of two operators may be that the terminal device actively performs measurement reporting of an inter-operator network; may be that a network of a SIM card or each SIM card configures, for the terminal device in a DSDS mode, a configuration of performing inter-operator network measurement; may be that the terminal device reports TDD configuration information of a network of one operator to another network; may be that the terminal device reports a strong interference pattern of one network to another network; may be that the terminal device reports a TDM pattern that is recommended by the terminal device and in which two networks perform or another network performs scheduling, where for example, the recommended TDM pattern may be that the slots 1 to 4 are used for transmission of the SIM card 1, and the slots 5 to 8 are used for transmission of the SIM card 2; or may be that the terminal device reports service information such as QoS information of two networks. For example, the SIM card 2 may notify a base station of the SIM card 2 that the base station of the SIM card 2 is expected to perform scheduling based on the pattern recommended by the terminal device. Specifically, the assistance information may be reported to the network when a DSDS dual SIM concurrent mode is activated. Alternatively, reporting may be performed when a SIM card enters a connected mode. Correspondingly, after the network obtains the assistance information reported by the terminal device, for example, the information about the timing offset between the operator networks, the TDM pattern recommended by the terminal device, or the service information, the network may perform scheduling based on the reported information. This method may well assist the terminal device in obtaining the proper transmission opportunities in the two networks.

Figure 4:
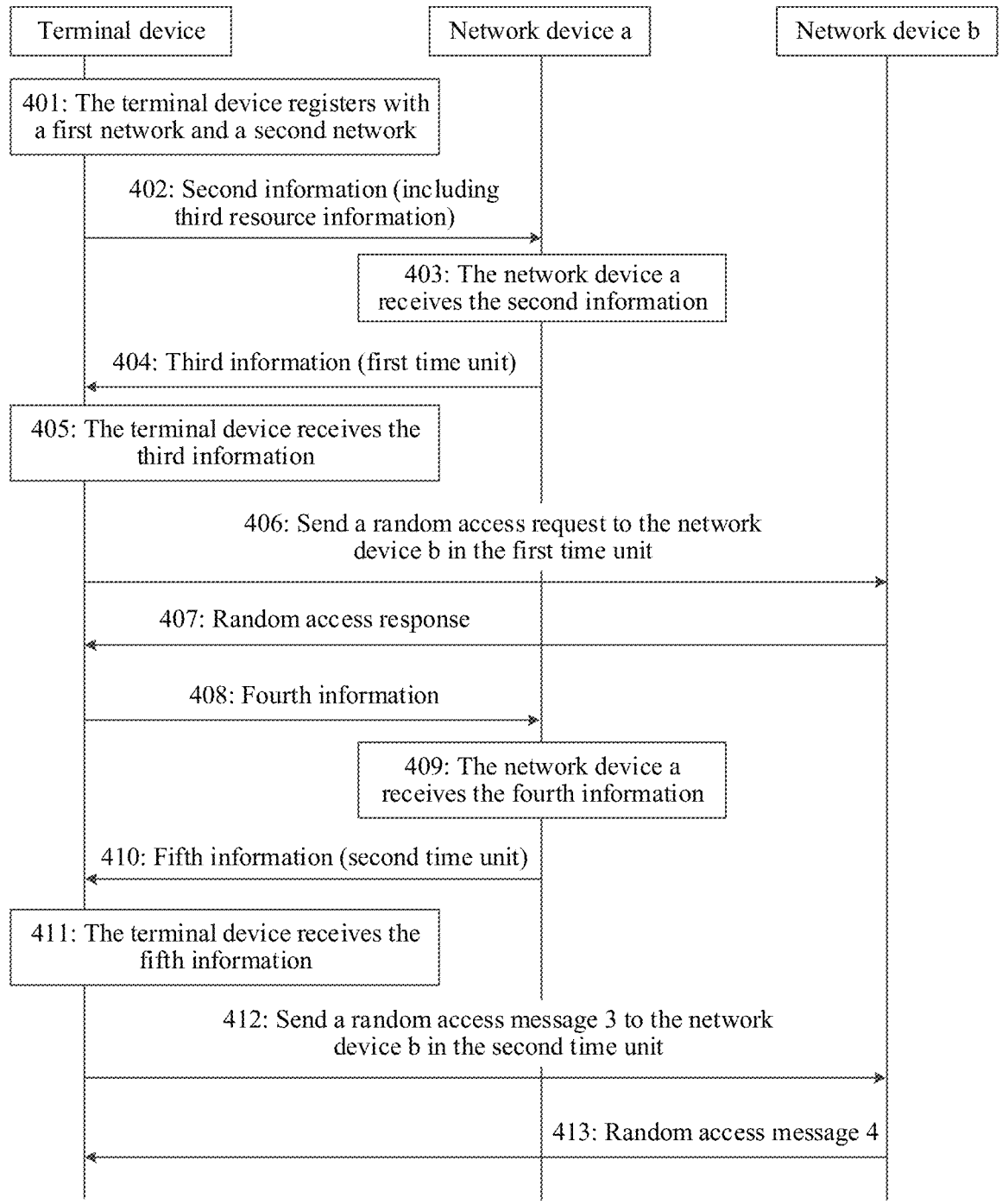
FIG. 4 is a schematic flowchart corresponding to still another communication method according to an embodiment of this application.

Based on the solution 3, FIG. 4 is a schematic flowchart corresponding to a communication method according to an embodiment of this application. In the solution 3, the terminal device may send the second assistance information to the network device (referred to as a network device a) in the first network, where the second assistance information is used by the network device a to assist the terminal device in randomly accessing the second network.

For example, the terminal device may randomly access the second network through a plurality of possible random access procedures. A possible random access procedure is a four-operation random access procedure. The four-operation random access procedure includes: The terminal device initiates a random access request (which may be referred to as a random access message 1) to the network device, the network device sends a random access response (which may be referred to as a random access message 2) to the terminal device, the terminal device initiates uplink transmission (which may be referred to as a random access message 3, where for example, for initial access, the random access message 3 transmits an RRC connection setup request) to the network device, and the network device sends a contention resolution message (which may be referred to as a random access message 4) to the terminal device. The following mainly uses an example in which the terminal device randomly accesses the second network through the four-operation random access procedure for description.

Content included in the second assistance information may not be limited in this embodiment of this application, but information that can serve a function of enabling the network device a to assist the terminal device in randomly accessing the second network falls within the protection scope of this embodiment of this application.

In an example (referred to as an example 1), the second assistance information may include second information and/or fourth information. The second information includes third resource information, and the third resource information is used to indicate random access resources of a network device (referred to as a network device b) in the second network, and/or is used to indicate a part of the random access resources selected by the terminal device from the random access resources of the network device b. The fourth information includes fourth resource information, and the fourth resource information is used to indicate a resource that is used to transmit the random access message 3 and that is obtained by the terminal device from the network device b. For example, the random access resources of the network device b may include a random access time domain resource and/or a random access frequency domain resource, or the random access resources of the network device b may include an available physical random access channel (physical random access channel, PRACH) resource of the network device b, for example, a PRACH time domain resource. For example, the random access resources of the network device b may include a PRACH time domain resource 1, a PRACH time domain resource 2, and a PRACH time domain resource 3.

It should be noted that when the second assistance information includes the second information and the fourth information, the terminal device may send the second information and the fourth information to the network device a by using different messages.

An example in which the second assistance information includes the second information and the fourth information is used below to describe a possible implementation procedure. As shown in FIG. 4, the method includes the following operations:

Operation 401: The terminal device registers with the first network and the second network.

Operation 402: The terminal device sends the second information to the network device a, where the second information includes the third resource information. Herein, an example in which the third resource information is used to indicate the random access resources of the network device b is used.

In an example, if the terminal device has selected a PRACH time domain resource, for example, the PRACH time domain resource 2, from the random access resources of the network device b, the third resource information is further used to indicate a part of the random access resources (that is, the PRACH time domain resource 2) selected by the terminal device from the random access resources of the network device b.

Correspondingly, in operation 403, the network device a receives the second information.

Operation 404: The network device a sends third information to the terminal device, where the third information is used to indicate a first time unit in which the network device a does not perform scheduling. The first time unit includes all or some time units corresponding to the random access resources of the network device b, or the first time unit includes all or some time units corresponding to the part of the random access resources selected by the terminal device. A time unit may be a slot, a symbol, or another possible time domain granularity. For example, when the time unit is the slot, the first time unit may include one or more slots.

Correspondingly, in operation 405, the terminal device receives the third information sent by the network device a.

Operation 406: The terminal device sends the random access request to the network device b in the first time unit.

For operation 404 to operation 406, it is assumed that the third resource information is used to indicate the random access resources of the network device b. In one embodiment, after receiving the second information, if the network device a determines that all time units corresponding to the random access resources of the network device b may not be scheduled, the network device a sends the third information to the terminal device. The third information is used to indicate the first time unit, and the first time unit includes all time units corresponding to the random access resources of the network device b (namely, all time units corresponding to the PRACH time domain resource 1, the PRACH time domain resource 2, and the PRACH time domain resource 3). Correspondingly, after receiving the third information, the terminal device may select one of the PRACH time domain resource 1, the PRACH time domain resource 2, and the PRACH time domain resource 3, and send the random access request by using a selected PRACH time domain resource.

In another possible implementation, after receiving the second information, if the network device a determines that some time units corresponding to the random access resources of the network device b may not be scheduled (for example, the terminal device needs to send an uplink data packet with a higher priority to the network device a in a time unit corresponding to the PRACH time domain resource 1, so that the network device a may not schedule time units corresponding to the PRACH time domain resource 2 and the PRACH time domain resource 3, but needs to schedule the time unit corresponding to the PRACH time domain resource 1), the network device a sends the third information to the terminal device. The third information is used to indicate the first time unit, and the first time unit includes some time units corresponding to the random access resources of the network device b (for example, the time units corresponding to the PRACH time domain resource 2 and the PRACH time domain resource 3). Correspondingly, after receiving the third information, the terminal device a may select one of the PRACH time domain resource 2 and the PRACH time domain resource 3, and send the random access request by using a selected PRACH time domain resource.

It may be understood that if the terminal device further sends, to the network device a, information about a resource (for example, the PRACH time domain resource 2) selected by the terminal device, the network device a may preferentially avoid the PRACH time domain resource 2, so that the terminal device subsequently sends the random access request by using the PRACH time domain resource 2.

Considering that the random access resources of the network device b may periodically appear, if the network device a determines that all time units corresponding to the random access resources of the network device b are not scheduled, the network device a may not schedule these time units in a plurality of periodicities. After random access of the terminal device succeeds, the terminal device may send indication information to the network device a to indicate that the random access succeeds, and then the network device a may schedule these time units. Therefore, if the random access of the terminal device fails, when reselecting the random access resource, the terminal device may preferentially select a random access resource previously used by the terminal device. For example, in one time of random access, if the terminal device fails to send the random access request by using the PRACH time domain resource 2, in a next time of random access, the terminal device may continue to send the random access request by using the PRACH time domain resource 2. Therefore, a random access failure that may be because the terminal device reselects another resource (but the network device a does not preferentially avoid the resource) is avoided.

Operation 407: The network device b sends the random access response to the terminal device.

Operation 408: The terminal device receives the random access response, and sends the fourth information to the network device a, where the fourth information includes the fourth resource information.

For example, the random access response may include uplink grant (UL grant) of the random access message 3 or a resource used to transmit the random access message 3. In this way, after receiving the random access response, the terminal device may obtain the resource used to transmit the random access message 3.

Correspondingly, in operation 409, the network device a receives the fourth information.

Operation 410: The network device a sends fifth information to the terminal device, where the fifth information is used to indicate a second time unit in which the network device a does not perform scheduling. The second time unit includes all or some time units corresponding to the resource used to transmit the random access message 3.

Correspondingly, in operation 411, the terminal device receives the fifth information sent by the network device a.

Operation 412: The terminal device sends the random access message 3 to the network device b in the second time unit.

Operation 413: The network device b sends the random access message 4 to the terminal device. In this way, the terminal device randomly accesses the network device b.

In the example 1, the terminal device may send the second information to the network device, so that the network device may attempt to avoid the random access resources of the network device b based on the second information (for example, if the network device a is performing voice transmission in a semi-persistent scheduling manner, semi-persistent scheduling may be reconfigured, to avoid the random access resources of the network device b or the part of the random access resources selected by the terminal device from the random access resources of the network device b). Further, the terminal device may send the fourth information to the network device, so that the network device may attempt, based on the fourth information, to avoid the resource used to transmit the random access message 3, and ensure that the terminal device can succeed in randomly accessing the second network.

In another example (referred to as an example 2), the second assistance information is used to request the network device a to suspend an uplink service of the first network. In this case, the second information may include a suspension indication. Further, the second information may further include information about a reason why the network device a is requested to suspend the uplink service of the first network. The information about the reason may include: An uplink service of the second network exists, the uplink service of the second network needs to be processed, or the terminal device needs to randomly access the second network. Correspondingly, after receiving the second assistance information, the network device a may suspend the uplink service of the first network based on the second assistance information, and may learn of the information about the reason why the uplink service of the first network is suspended, so that the terminal device can preferentially succeed in randomly accessing the second network.

It should be noted that operation numbers in FIG. 4 are merely numbered for ease of description, and do not constitute a limitation on an execution sequence of the operations. There is no strict execution sequence between operations that do not have a time sequence dependency relationship among the foregoing operations, and the sequence may be adjusted according to an actual situation. The operations in FIG. 4 are not necessary operations in an execution procedure. In specific implementations, the operations may be deleted according to an actual requirement.

According to the method in solution 3, the terminal device may send the second assistance information to the network device a, so that the network device a can assist, based on the second assistance information, the terminal device in randomly accessing the second network, to ensure that the terminal device can succeed in randomly accessing the second network, and implement effective communication between the terminal device and the network device.

To be specific, in the solution 3, a service of a SIM card 2 is activated, to trigger a need to establish a connection to the network device b. Therefore, a SIM card 1 reports, to the network device a, indication information indicating that the service of the SIM card 2 is activated, and requests assistance of the network device a. To perform a random access process in the network device b, the terminal device may assist in reporting PRACH configuration information of the network device b to the network device a. In an example, the network device a may send a response message to the terminal device. For example, the response message may carry non-scheduling slot information used by the terminal device to perform access in the network device b. The terminal device performs access in the network device b. If the network device a provides information used to assist in accessing the network device b, for example, the non-scheduling slot information, the terminal device preferentially initiates the random access process in the network device b in a non-scheduling slot of the network device a. The terminal device establishes an RRC connection to the network device b, and provides necessary assistance information (for example, first assistance information). After obtaining the assistance information reported by the terminal device, for example, information about a timing offset between operator networks and a TDM pattern recommended by the terminal device, the network device b may perform scheduling based on the pattern recommended by the terminal device. Alternatively, after obtaining TDD configuration information of the network device a, the network device b configures a proper slot or symbol for the terminal device to perform data transmission.

For example, the terminal device may also report, to the network device a, RA occasions information selected by the SIM card 2 in the network device b. Further, during subsequent PRACH resource reselection, the terminal device may continue to select a previously used resource. For example, the random access response includes information about a resource used to schedule the random access message 3 and a backoff indication. The terminal device may report the information in the random access response to the network device a, to obtain the non-scheduling slot information of the network device a.

In this embodiment of this application, for a voice service, before the network device b initiates connection establishment, the terminal device actively requests a current SIM card 1 network to suspend a current service, and the SIM card 2 is preferentially allowed to complete a connection establishment process. A specific reason for requesting suspension may have a plurality of representations: (a) a simple indication: indication information indicating that a service currently exists in the SIM card 2; (b) a resource type indication: an indication indicating whether the SIM card 2 currently uses semi-persistent scheduling (SPS) or scheduling-free, or a specific resource parameter; (c) an indication indicating whether the SIM card 2 uses dynamic scheduling; and (d) a suspension indication. In the foregoing case, if the network device a previously performs voice transmission in a dynamic scheduling mode, the dynamic scheduling mode may be reconfigured as a configured grant (CG) resource manner or an SPS resource manner. Then, the terminal device completes access in the network device b in an idle period in which SPS or CG transmission is not performed, and the terminal device needs to avoid a time period overlapping with a time period occupied by the SPS or the CG during random access resource selection. If the terminal device determines that the voice service can be performed in both networks, the terminal device may report a current SPS/CG configuration of the SIM card 1 to the network device b of the SIM card 2, so that a network of the SIM card 2 configures a proper SPS and CG resource or a dynamically scheduled resource.

For the solution 1, the solution 2, and the solution 3, it should be noted that (1) the solution 1, the solution 2, and the solution 3 may be separately implemented, or may be implemented in combination. For example, at least two of the solution 1, the solution 2, and the solution 3 may be implemented in combination. In the embodiments of this application, for some content in the solution 1, the solution 2, and the solution 3, reference may be made to each other. For example, for content that the terminal device registers with the first network and the second network in the solution 2 and the solution 3, reference may be made to the descriptions in the solution 1. For each of the solution 1 to the solution 3, when there are a plurality of possible implementations, the embodiments of this application describe only differences between the plurality of possible implementations, and other content may be cross-referenced. (2) The solution 1, the solution 2, and the solution 3 are mainly described by using an example in which the terminal device is a terminal device supporting dual SIM cards. The embodiments of this application are also applicable to an operation performed when another terminal device is connected to a plurality of network devices in one or more networks. For example, the embodiments of this application are also applicable to a scenario in which a terminal device supporting a single SIM card initiates connection establishment to the third network device when the terminal device is connected to two network devices.

The foregoing mainly describes the solutions provided in this application from the perspective of interaction between the network device and the terminal device. It may be understood that to implement the foregoing functions, each network element includes a corresponding hardware structure and/or software module (or unit) for implementing each function. A person skilled in the art should easily be aware that, in combination with the units and algorithm operations in the examples described in the embodiments disclosed in this specification, the present disclosure may be implemented by hardware or a combination of hardware and computer software. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 5:
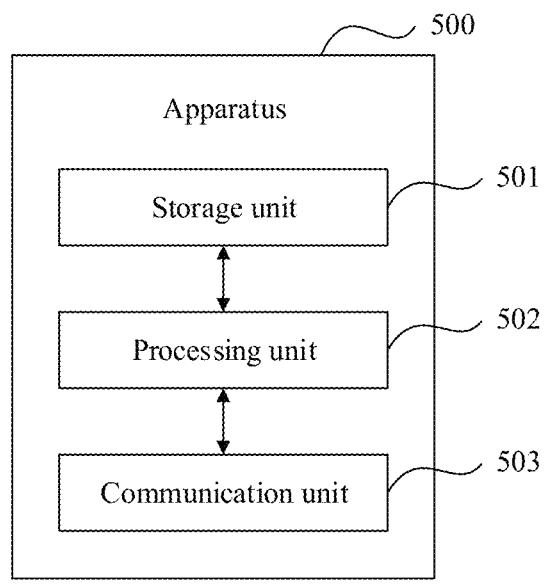
FIG. 5 is a schematic block diagram of a terminal device according to an embodiment of the present disclosure.

When an integrated unit (module) is used, FIG. 5 is a possible example block diagram of an apparatus according to an embodiment of this application. The apparatus 500 may exist in a form of software. The apparatus 500 may include a processing unit 502 and a communication unit 503. The processing unit 502 is configured to control and manage an action of the apparatus 500. The communication unit 503 is configured to support communication between the apparatus 500 and another network entity. In one embodiment, the communication unit 503 is also referred to as a transceiver unit, and may include a receiving unit and/or a sending unit, which are respectively configured to perform a receiving operation and a sending operation. The apparatus 500 may further include a storage unit 501, configured to store program code and/or data of the apparatus 500.

The apparatus 500 may be the terminal device in any one of the foregoing embodiments, or may be a semiconductor chip disposed in the terminal device. The processing unit 502 may support the apparatus 500 in performing actions of the terminal device in the foregoing method examples. Alternatively, the processing unit 502 mainly performs internal actions of the terminal device in the method examples, and the communication unit 503 may support communication between the apparatus 500 and a network device.

Specifically, in an embodiment, the processing unit 502 is configured to register with a first network and a second network.

The communication unit 503 is configured to send first information to the network device, where the first information is used to indicate that the terminal device is to enter a first transmission manner or has entered the first transmission manner; and the network device may be a network device in the first network or a network device in the second network. The first transmission manner includes: The terminal device concurrently processes an uplink service of the first network and an uplink service of the second network.

In one embodiment, when processing a communication service of the first network, the processing unit 502 sends the first information to the network device in the first network by using the communication unit 503 if a first condition is satisfied.

That the first condition is satisfied includes at least one of the following:

the terminal device determines that a radio resource control RRC connection needs to be established in the second network;
the terminal device determines that a location domain needs to be updated in the second network;
the terminal device determines that an emergency call needs to be initiated in the second network;
the terminal device determines that an on-demand system information request needs to be executed in the second network; or the terminal device determines that random access needs to be performed in the second network.

In one embodiment, the network device is the network device in the first network, and the first information includes at least one of the following:

information about a timing offset between the first network and the second network;
time division duplex TDD configuration information of the second network;
first resource information and/or second resource information;
quality of service QoS information of the uplink service of the second network;
configuration information used by the network device in the second network to perform semi-persistent scheduling on the terminal device;
indication information indicating that the network device in the second network performs dynamic scheduling on the terminal device;
information about a reason why the terminal device accesses the second network; or
information about a reason why the terminal device enters the first transmission manner.

The first resource information is used to indicate an available time unit in which the network device in the first network schedules the terminal device, and the second resource information is used to indicate an available time unit in which the network device in the second network schedules the terminal device.

In one embodiment, the network device is the network device in the first network. The communication unit 503 is specifically configured to send second information to the network device in the first network, where the second information includes third resource information, and the third resource information is used to indicate random access resources of the network device in the second network, and/or is used to indicate a part of the random access resources selected by the terminal device from the random access resources.

In one embodiment, the communication unit 503 is configured to receive third information sent by the network device in the first network, where the third information is used to indicate a first time unit in which the network device in the first network does not perform scheduling; and the first time unit includes all or some time units corresponding to the random access resources, or the first time unit includes all or some time units corresponding to the part of the random access resources. The communication unit 503 is further configured to send a random access request to the network device in the second network in the first time unit.

In one embodiment, the network device is the network device in the first network. The communication unit 503 is further configured to send fourth information to the network device in the first network, where the fourth information includes fourth resource information, and the fourth resource information is used to indicate a resource that is used to transmit a random access message 3 and that is obtained by the terminal device from the network device in the second network.

In one embodiment, communication unit 503 is configured to receive fifth information sent by the network device in the first network, where the fifth information is used to indicate a second time unit in which the network device in the first network does not perform scheduling, and the second time unit includes all or some time units corresponding to the resource that is used to transmit the random access message 3. The communication unit 503 is further configured to send the random access message 3 to the network device in the second network in the second time unit.

In one embodiment, the network device is the network device in the second network. The communication unit 503 is further configured to: send the random access message 3 to the network device in the second network, where the random access message 3 includes the first information; or after successfully accessing the network device in the second network, send the first information to the network device in the second network.

In one embodiment, the first information includes at least one of the following:

the information about the timing offset between the first network and the second network;
time division duplex TDD configuration information of the first network;

the first resource information and/or the second resource information;

quality of service QoS information of the uplink service of the first network;

configuration information used by the network device in the first network to perform semi-persistent scheduling on the terminal device;

indication information indicating that the network device in the first network performs dynamic scheduling on the terminal device; or the information about the reason why the terminal device enters the first transmission manner.

The first resource information is used to indicate the available time unit in which the network device in the first network schedules the terminal device, and the second resource information is used to indicate the available time unit in which the network device in the second network schedules the terminal device.

In one embodiment, that the terminal device concurrently processes an uplink service of the first network and an uplink service of the second network includes: The terminal device concurrently processes the uplink service of the first network and the uplink service of the second network in time domain.

Figure 6:
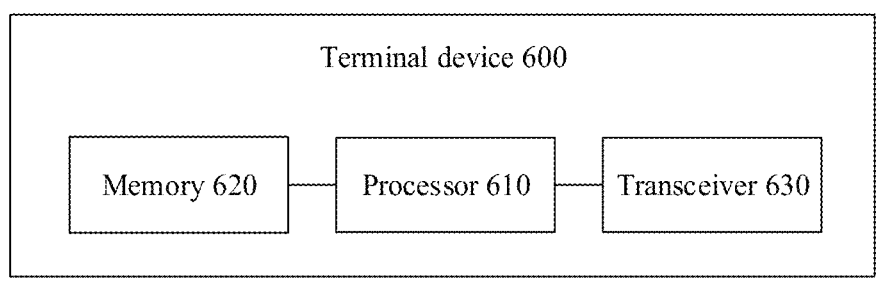
FIG. 6 is another schematic block diagram of a terminal device according to an embodiment of the present disclosure.

As shown in FIG. 6, an embodiment of the present disclosure further provides a terminal device 600. The terminal device 600 includes a processor 610, a memory 620, and a transceiver 630. The memory 620 stores instructions or a program, and the memory 620 is configured to implement a function of the storage unit 501 in the foregoing embodiment. The processor 610 is configured to execute the instructions or the program stored in the memory 620. When the instructions or the program stored in the memory 620 are/is executed, the processor 610 is configured to perform an operation performed by the processing unit 502 in the foregoing embodiment, and the transceiver 630 is configured to perform an operation performed by the communication unit 503 in the foregoing embodiment.

It should be understood that the terminal device 500 or the terminal device 600 according to the embodiments of the present disclosure may correspond to the terminal device in the communication method (FIG. 2 to FIG. 4) in the embodiments of the present disclosure, and operations and/or functions of the modules in the terminal device 500 or the terminal device 600 are separately used to implement corresponding procedures of the methods in FIG. 2 to FIG. 4. For brevity, details are not described herein again.

Figure 7:
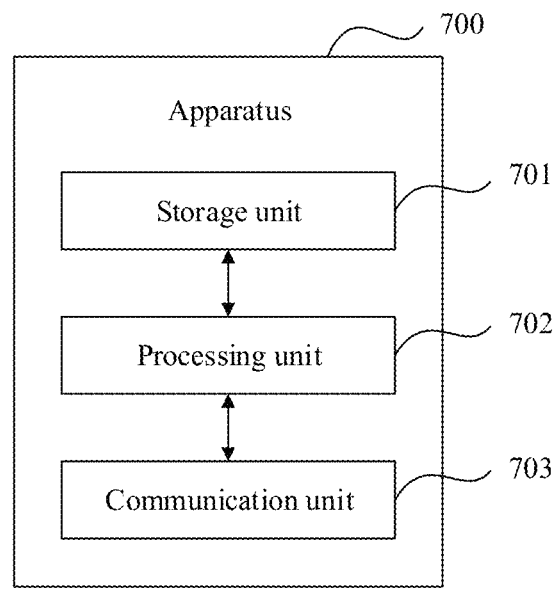
FIG. 7 is a schematic block diagram of a network device according to an embodiment of the present disclosure.

When an integrated unit (module) is used, FIG. 7 is still another possible example block diagram of an apparatus according to an embodiment of this application. The apparatus 700 may exist in a form of software. The apparatus 700 may include a processing unit 702 and a communication unit 703. The processing unit 702 is configured to control and manage an action of the apparatus 700. The communication unit 703 is configured to support communication between the apparatus 700 and another network entity. In one embodiment, the communication unit 703 is also referred to as a transceiver unit, and may include a receiving unit and/or a sending unit, which are respectively configured to perform a receiving operation and a sending operation. The apparatus 700 may further include a storage unit 701, configured to store program code and/or data of the apparatus 700.

The apparatus 700 may be the network device in any one of the foregoing embodiments, or may be a semiconductor chip disposed in the network device. The processing unit 702 may support the apparatus 700 in performing actions of the network device in the foregoing method examples. Alternatively, the processing unit 702 mainly performs internal actions of the network device in the method examples, and the communication unit 703 may support communication between the apparatus 700 and a terminal device.

In an embodiment, the communication unit 703 is configured to receive first information sent by the terminal device, where the first information is used to indicate that the terminal device is to enter a first transmission manner or has entered the first transmission manner.

The processing unit 702 is configured to enter a second transmission manner corresponding to the first transmission manner. The first transmission manner includes: The terminal device concurrently processes an uplink service of a first network and an uplink service of a second network. The network device is a network device in the first network or a network device in the second network.

In one embodiment, the processing unit 702 is specifically configured to update a bit error rate threshold of uplink transmission of the terminal device from a first value to a second value, where the second value is greater than the first value.

In one embodiment, the apparatus 700 is the network device in the first network, and the first information includes at least one of the following:

information about a timing offset between the first network and the second network;

TDD configuration information of the second network;

first resource information and/or second resource information;

QoS information of the uplink service of the second network;

configuration information used by the network device in the second network to perform semi-persistent scheduling on the terminal device;

indication information indicating that the network device in the second network performs dynamic scheduling on the terminal device;

information about a reason why the terminal device accesses the second network; or information about a reason why the terminal device enters the first transmission manner.

The first resource information is used to indicate an available time unit in which the network device in the first network schedules the terminal device, and the second resource information is used to indicate an available time unit in which the network device in the second network schedules the terminal device.

In one embodiment, the apparatus 700 is the network device in the first network. The communication unit 703 is further configured to: receive second information sent by the terminal device, where the second information includes third resource information, and the third resource information is used to indicate random access resources of the network device in the second network, and/or the third resource information is used to indicate a part of the random access resources selected by the terminal device from the random access resources. The network device in the first network sends third information to the terminal device, where the third information is used to indicate a first time unit in which the network device in the first network does not perform scheduling; and the first time unit includes all or some time units corresponding to the random access resources, or the first time unit includes all or some time units corresponding to the part of the random access resources.

In one embodiment, the apparatus 700 is the network device in the first network. The communication unit 703 is further configured to: receive fourth information sent by the terminal device, where the fourth information includes fourth resource information, and the fourth resource information is used to indicate a resource that is used to transmit a random access message 3 and that is obtained by the terminal device from the network device in the second network. The network device in the first network sends fifth information to the terminal device, where the fifth information is used to indicate a second time unit in which the network device in the first network does not perform scheduling, and the second time unit includes all or some time units corresponding to the resource that is used to transmit the random access message 3.

In one embodiment, the apparatus 700 is the network device in the second network. The communication unit 703 is further configured to: receive the random access message 3 sent by the terminal device, where the random access message 3 includes the first information; or receive the first information sent by the terminal device after the terminal device successfully accesses the network device in the second network.

In one embodiment, the first information includes at least one of the following:
the information about the timing offset between the first network and the second network;
time division duplex TDD configuration information of the first network;
the first resource information and/or the second resource information;
quality of service QoS information of the uplink service of the first network;
configuration information used by the network device in the first network to perform semi-persistent scheduling on the terminal device;
indication information indicating that the network device in the first network performs dynamic scheduling on the terminal device; or
the information about the reason why the terminal device enters the first transmission manner.

The first resource information is used to indicate the available time unit in which the network device in the first network schedules the terminal device, and the second resource information is used to indicate the available time unit in which the network device in the second network schedules the terminal device.

In one embodiment, that the terminal device concurrently processes an uplink service of the first network and an uplink service of the second network includes: The terminal device concurrently processes the uplink service of the first network and the uplink service of the second network in time domain.

Figure 8:
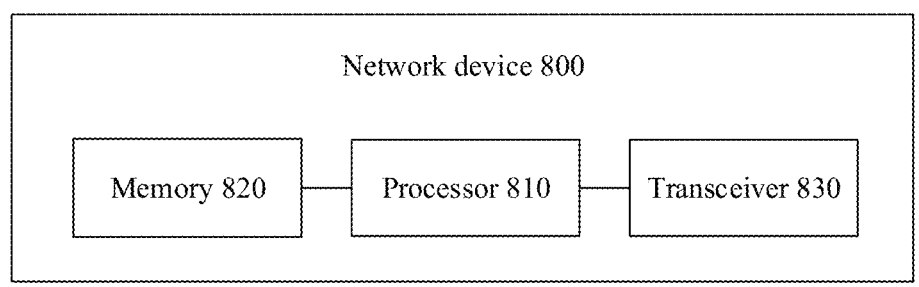
FIG. 8 is another schematic block diagram of a network device according to an embodiment of the present disclosure.

As shown in FIG. 8, an embodiment of the present disclosure further provides a network device 800. The network device 800 includes a processor 810, a memory 820, and a transceiver 830. The memory 820 stores instructions or a program, and the memory 820 is configured to implement a function of the storage unit 701 in the foregoing embodiment. The processor 810 is configured to execute the instructions or the program stored in the memory 820. When the instructions or the program stored in the memory 820 are/is executed, the processor 810 is configured to perform an operation performed by the processing unit 702 in the foregoing embodiment, and the transceiver 830 is configured to perform an operation performed by the communication unit 703 in the foregoing embodiment.

It should be understood that the network device 700 or the network device 800 according to the embodiments of the present disclosure may correspond to the network device in the communication method (FIG. 2 to FIG. 4) in the embodiments of the present disclosure, and operations and/or functions of the modules in the network device 700 or the network device 800 are separately used to implement corresponding procedures of the methods in FIG. 2 to FIG. 4. For brevity, details are not described herein again.

An embodiment of this application further provides a communication apparatus. The communication apparatus may be a terminal device or a circuit. The communication apparatus may be configured to perform an action performed by the terminal device in the foregoing method embodiments.

Figure 9:
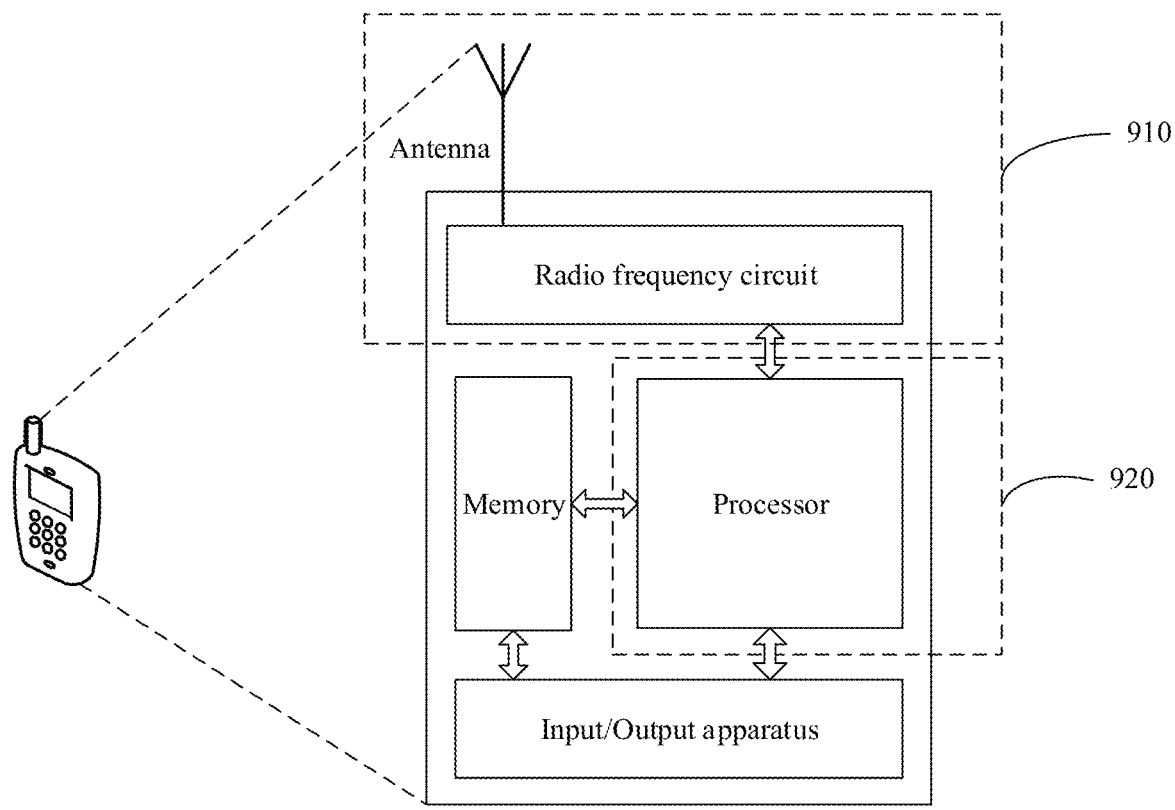
FIG. 9 is a schematic diagram of a structure of a terminal device according to an embodiment of this application.

When the communication apparatus is a terminal device, FIG. 9 is a simplified schematic diagram of a structure of a terminal device. For ease of understanding and illustration, in FIG. 9, an example in which the terminal device is a mobile phone is used. As shown in FIG. 9, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, such as a touchscreen, a display screen, and a keyboard, is mainly configured to receive data input by a user and output data to the user. It should be noted that some types of terminal devices may not have an input/output apparatus.

When data needs to be sent, the processor performs baseband processing on to-be-sent data, and outputs a baseband signal to the radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit (or a communication unit) of the terminal device, and the processor having a processing function may be considered as a processing unit of the terminal device. As shown in FIG. 9, the terminal device includes a transceiver unit 910 and a processing unit 920. The transceiver unit may also be referred to as a transceiver machine, a transceiver, a transceiver apparatus, or the like. The processing unit may also be referred to as a processor, a processing board, a processing module, a processing apparatus, or the like. In one embodiment, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes a receiving unit and a sending unit. The transceiver unit sometimes may also be referred to as a transceiver, a transceiver machine, a transceiver circuit, or the like. The receiving unit may also be sometimes referred to as a receiver, a receiver machine, a receiver circuit, or the like. The sending unit may also be sometimes referred to as a transmitter, a transmitter machine, a transmitter circuit, or the like.

It should be understood that the transceiver unit 910 is configured to perform a sending operation and a receiving operation on a terminal device side in the foregoing method embodiments, and the processing unit 920 is configured to perform an operation other than the sending operation and the receiving operation on the terminal device in the foregoing method embodiments.

For example, in an implementation, the transceiver unit 910 is configured to perform the sending operation on the terminal device side in operation 202, operation 205, operation 208, and operation 211 in FIG. 2, and/or the transceiver unit 910 is further configured to perform another receiving and sending operation on the terminal device side in the embodiments of this application. The processing unit 920 is configured to perform operation 201 in FIG. 2, and/or the processing unit 920 is further configured to perform another processing operation on the terminal device side in the embodiments of this application.

For another example, in another implementation, the transceiver unit 910 is configured to perform the sending operation on the terminal device side in operation 302 and operation 305 in FIG. 3, and/or the transceiver unit 910 is further configured to perform another receiving and sending operation on the terminal device side in the embodiments of this application. The processing unit 920 is configured to perform operation 301 in FIG. 3, and/or the processing unit 920 is further configured to perform another processing operation on the terminal device side in the embodiments of this application.

For still another example, in still another implementation, the transceiver unit 910 is configured to perform the sending operation on the terminal device side in operation 402, operation 406, operation 408, and operation 412 in FIG. 4 and the receiving operation on the terminal device side in operation 404 and operation 407, and operation 410 and operation 413, and/or the transceiver unit 910 is further configured to perform another receiving and sending operation on the terminal device side in the embodiments of this application. The processing unit 920 is configured to perform operation 401 in FIG. 4, and/or the processing unit 920 is further configured to perform another processing operation on the terminal device side in the embodiments of this application.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 10:
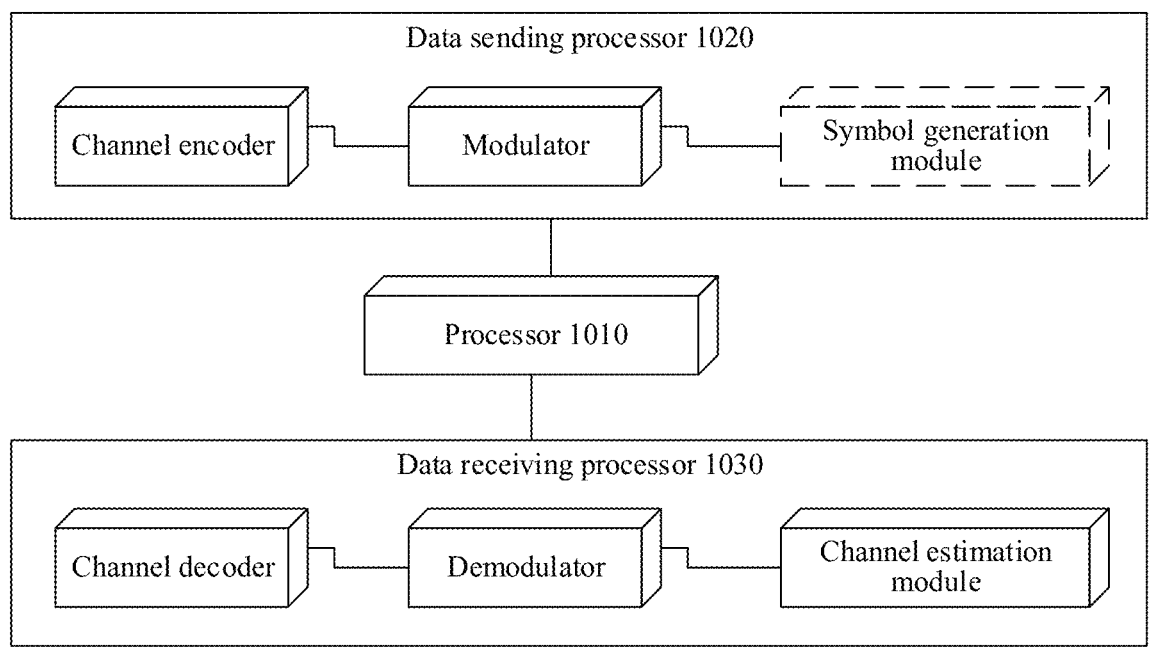
FIG. 10 is a schematic block diagram of a communication apparatus according to an embodiment of this application.

When the communication apparatus in this embodiment is a terminal device, reference may be made to a device shown in FIG. 10. In an example, the device can implement a function similar to that of the processor 610 in FIG. 6. In FIG. 10, the device includes a processor 1010, a data sending processor 1020, and a data receiving processor 1030. The processing unit 502 in the foregoing embodiment may be the processor 1010 in FIG. 10, and implements a corresponding function. The communication unit 503 in the foregoing embodiment may be the data sending processor 1020 and/or the data receiving processor 1030 in FIG. 10. Although FIG. 10 shows a channel encoder, a modulator, a symbol generation module, a channel decoder, a demodulator, and a channel estimation module, it may be understood that the modules are merely examples, and do not constitute a limitation on this embodiment.

Figure 11:
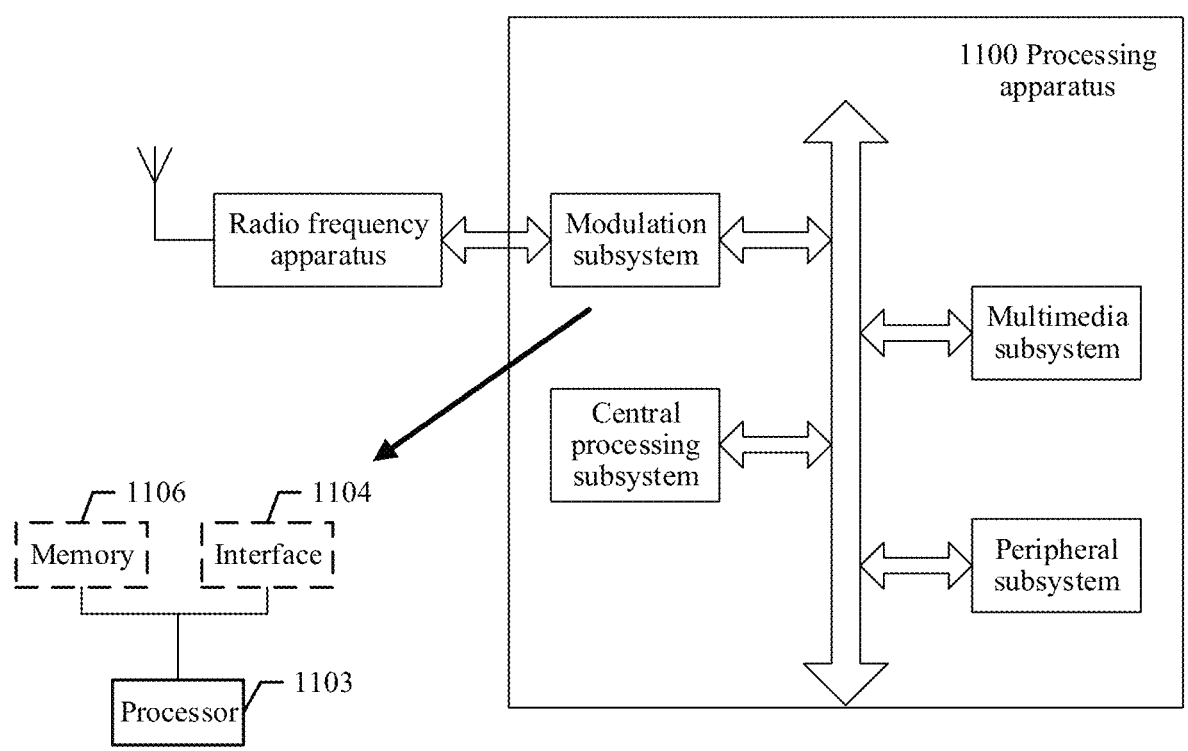
FIG. 11 is another schematic block diagram of a communication apparatus according to an embodiment of this application.

FIG. 11 shows another form according to an embodiment of this application. A processing apparatus 1100 includes modules such as a modulation subsystem, a central processing subsystem, and a peripheral subsystem. The communication apparatus in this embodiment may be used as the modulation subsystem in the processing apparatus 1100. Specifically, the modulation subsystem may include a processor 1103 and an interface 1104. The processor 1103 implements a function of the processing unit 502, and the interface 1104 implements a function of the communication unit 503. In another variation, the modulation subsystem includes a memory 1106, a processor 1103, and a program that is stored in the memory 1106 and that can be run on the processor. When executing the program, the processor 1103 implements the method on the terminal device side in the foregoing method embodiments. It should be noted that the memory 1106 may be non-volatile or volatile. The memory 1106 may be located in the modulation subsystem, or may be located in the processing apparatus 1100, provided that the memory 1106 can be connected to the processor 1103.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product including instructions is provided. When the instructions are executed, the method on the terminal device side in the foregoing method embodiments is performed.

Figure 12:
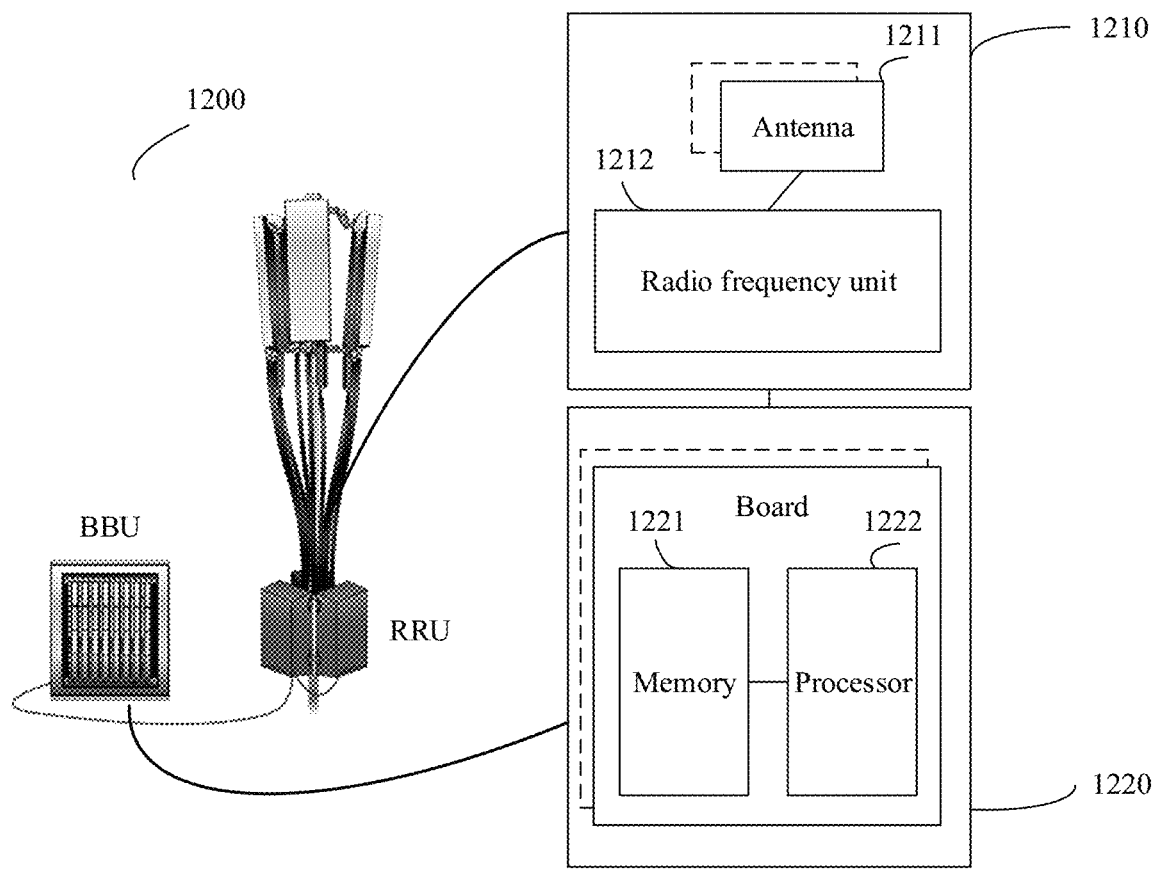
FIG. 12 is a schematic diagram of a structure of a network device according to an embodiment of this application.

When the apparatus in this embodiment is a network device, the network device may be shown in FIG. 12. An apparatus 1200 includes one or more radio frequency units, such as a remote radio unit (remote radio unit, RRU) 1210 and one or more baseband units (baseband unit, BBU) (which may also be referred to as digital units (digital units, DUs) 1220). The RRU 1210 may be referred to as a communication unit, and corresponds to the communication unit 703 in FIG. 7. In one embodiment, the communication unit may be further referred to as a transceiver, a transceiver circuit, a transceiver machine, or the like, and may include at least one antenna 1211 and a radio frequency unit 1212. The RRU 1210 is mainly configured to: receive and send a radio frequency signal, and perform conversion between the radio frequency signal and a baseband signal. For example, the RRU 1210 is configured to send indication information to a terminal device. The BBU 1210 is mainly configured to: perform baseband processing, control a base station, and so on. The RRU 1210 and the BBU 1220 may be physically disposed together, or may be physically disposed separately, that is, in a distributed base station.

The BBU 1220 is a control center of the base station, and may also be referred to as a processing module. The BBU 1220 may correspond to the processing module 820 in FIG. 8, and is mainly configured to implement a baseband processing function such as channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 1220 may include one or more boards, and a plurality of boards may jointly support a radio access network (such as an LTE network) having a single access standard, or may separately support radio access networks (such as an LTE network, a 5G network, or another network) having different access standards. The BBU 1220 further includes a memory 1221 and a processor 1222. The memory 1221 is configured to store necessary instructions and necessary data. The processor 1222 is configured to control the base station to perform a necessary action, for example, is configured to control the base station to perform an operation procedure related to the network device in the foregoing method embodiments. The memory 1221 and the processor 1222 may serve one or more boards. In other words, a memory and a processor may be independently disposed on each board, or a plurality of boards may share a same memory and a same processor. In addition, a necessary circuit may be further disposed on each board.

In another form of this embodiment, a computer-readable storage medium is provided. The computer-readable storage medium stores instructions. When the instructions are executed, the method on the network device side in the foregoing method embodiments is performed.

In another form of this embodiment, a computer program product including instructions is provided. When the instructions are executed, the method on the network device side in the foregoing method embodiments is performed.

In an implementation process, the operations of the method in the embodiments can be completed by using a hardware integrated logical circuit in the processor, or by using instructions in a form of software. The operations of the methods disclosed with reference to the embodiments of this application may be directly performed by a hardware processor, or may be performed by a combination of hardware and software modules in the processor.

It should be noted that, the processor in the embodiments of this application may be an integrated circuit chip, and has a signal processing capability. In an implementation process, operations in the foregoing method embodiments may be implemented by using a hardware integrated logic circuit in the processor, or by using instructions in a form of software. The processor may be a general-purpose central processing unit (CPU), a general-purpose processor, digital signal processing (DSP), an application-specific integrated circuit (ASIC), a field programmable gate array (FPGA), another programmable logic device, a transistor logic device, a hardware component, or any combination thereof or may be a combination of processors implementing a computing function, for example, a combination of one or more microprocessors or a combination of a DSP and a microprocessor. The general-purpose processor may be a microprocessor, or the processor may be any conventional processor, or the like.

It may be understood that the memory or storage unit in the embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memories in the systems and methods described in this specification include but are not limited to these memories and any memory of another suitable type.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on the computer, the procedure or functions according to the embodiments of this application are all or partially generated. The computer may be a general-purpose computer, a special-purpose computer, a computer network, or another programmable apparatus. The computer programs or instructions may be stored in a computer-readable storage medium, or may be transmitted by using the computer-readable storage medium. The computer-readable storage medium may be any usable medium accessible by a computer, or a data storage device, such as a server, integrating one or more usable media. The usable medium may be a magnetic medium, for example, a floppy disk, a hard disk, or a magnetic tape; or may be an optical medium, for example, a DVD; or may be a semiconductor medium, for example, a solid-state disk (SSD).

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. In one embodiment, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

The operations of the methods or algorithms described in the embodiments of this application may be implemented by directly embedded hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. In one embodiment, the storage medium may alternatively be integrated into a processor. The processor and the storage medium may be disposed in the ASIC, and the ASIC may be disposed in a terminal device. In one embodiment, the processor and the storage medium may alternatively be disposed in different components of the terminal device.

These computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although the embodiments of this application are described with reference to specific features, it is clear that various modifications and combinations may be made to them without departing from the spirit and scope of the embodiments of this application. Correspondingly, the specification and accompanying drawings are merely example descriptions of the embodiments of this application that are defined by the appended claims, and are considered to cover any or all of modifications, variations, combinations, or equivalents in the scope of the embodiments of this application.

What is claimed is:

1. A communication method comprising:
registering, by a communication device, with a first network and a second network; and
sending, by the communication device, first information to a network device in the first network or in the second network, wherein the first information is used to indicate that the communication device is to enter a first transmission manner or has entered the first transmission manner, wherein
the first transmission manner comprises: the communication device concurrently processes an uplink service of the first network and an uplink service of the second network,
wherein the network device is the network device in the first network, wherein the first information comprises at least one of first resource information or second resource information, and wherein
the first resource information is used to indicate an available time unit in which the network device in the first network schedules the communication device, and the second resource information is used to indicate an available time unit in which the network device in the second network schedules the communication device.

2. The method according to claim 1, wherein the sending, by the communication device, the first information to the network device comprises:
when processing a communication service of the first network, sending, by the communication device, the first information to the network device in the first network in response to a first condition is satisfied which comprises at least one of:
the communication device determines that a radio resource control (RRC) connection needs to be established in the second network;
the communication device determines that a location domain needs to be updated in the second network;
the communication device determines that an emergency call needs to be initiated in the second network;
the communication device determines that an on-demand system information request needs to be executed in the second network; or
the communication device determines that random access needs to be performed in the second network.

3. The method according to claim 1, wherein the first information further comprises at least one of information about a timing offset between the first network and the second network;
time division duplex (TDD) configuration information of the second network;
first resource information and/or second resource information;
configuration information used by the network device in the second network to perform semi-persistent scheduling on the communication device;
indication information indicating that the network device in the second network performs dynamic scheduling on the communication device;
information about a reason why the communication device accesses the second network; or
information about a reason why the communication device enters the first transmission manner.

4. The method according to claim 1, wherein the network device is the network device in the first network, and the method further comprises:
sending, by the communication device, second information to the network device in the first network, wherein the second information comprises third resource information to indicate random access resources of the network device in the second network, and/or to indicate a part of the random access resources selected by the communication device from the random access resources.

5. The method according to claim 4, the method further comprising:
receiving, by the communication device, third information sent by the network device in the first network, wherein the third information is used to indicate a first time unit in which the network device in the first network does not perform scheduling; and wherein the first time unit comprises all or some time units corresponding to the random access resources or the part of the random access resources; and
sending, by the communication device, a random access request to the network device in the second network in the first time unit.

6. The method according to claim 1, wherein the network device is the network device in the first network, the method further comprising:
sending, by the communication device, fourth information to the network device in the first network, wherein the fourth information comprises fourth resource information to indicate a resource that is used to transmit a random access message 3 and that is obtained by the communication device from the network device in the second network.

7. The method according to claim 6, the method further comprising:
receiving, by the communication device, fifth information sent by the network device in the first network, wherein the fifth information is used to indicate a second time unit in which the network device in the first network does not perform scheduling, and wherein the second time unit comprises all or some time units corresponding to the resource that is used to transmit the random access message 3; and
sending, by the communication device, the random access message 3 to the network device in the second network in the second time unit.

8. A communication method, comprising:
receiving, by a network device, first information sent by a communication device in a first network or in a second network, wherein the first information is used to indicate that the communication device is to enter a first transmission manner or has entered the first transmission manner; and entering, by the network device, a second transmission manner corresponding to the first transmission manner, wherein the first transmission manner comprises: the communication device concurrently processes an uplink service of a first network and an uplink service of a second network, wherein the network device is the network device in the first network, wherein the first information comprises at least one of first resource information or second resource information, and wherein the first resource information is used to indicate an available time unit in which the network device in the first network schedules the communication device, and the second resource information is used to indicate an available time unit in which the network device in the second network schedules the communication device.

9. The method according to claim 8, wherein the entering, by the network device, a second transmission manner comprises:

updating, by the network device, a bit error rate threshold of uplink transmission of the communication device from a first value to a second value greater than the first value.

10. A communication apparatus comprising:

a processing unit, configured to register with a first network and a second network; and a communication unit, configured to send first information to a network device in the first network or in the second network, wherein the first information is used to indicate that the communication apparatus is to enter a first transmission manner or has entered the first transmission manner, wherein the first transmission manner comprises: the communication apparatus concurrently processes an uplink service of the first network and an uplink service of the second network, wherein the network device is the network device in the first network, wherein the first information comprises at least one of first resource information or second resource information, and wherein the first resource information is used to indicate an available time unit in which the network device in the first network schedules the communication apparatus, and the second resource information is used to indicate an available time unit in which the network device in the second network schedules the communication apparatus.

11. The apparatus according to claim 10, wherein the processing unit is configured to: when processing a communication service of the first network, send the first information to the network device in the first network by using the communication unit in response to a first condition is satisfied which comprises at least one of:
the communication apparatus determines that a radio resource control (RRC) connection needs to be established in the second network;
the communication apparatus determines that a location domain needs to be updated in the second network;
the communication apparatus determines that an emergency call needs to be initiated in the second network;
the communication apparatus determines that an on-demand system information request needs to be executed in the second network; or
the communication apparatus determines that random access needs to be performed in the second network.

12. The apparatus according to claim 10, wherein the first information further comprises at least one of:

information about a timing offset between the first network and the second network;

time division duplex (TDD) configuration information of the second network;

quality of service (QOS) information of the uplink service of the second network;

configuration information used by the network device in the second network to perform semi-persistent scheduling on the communication apparatus;

indication information indicating that the network device in the second network performs dynamic scheduling on the communication apparatus;

information about a reason why the communication apparatus accesses the second network; or information about a reason why the communication apparatus enters the first transmission manner.

13. The apparatus according to claim 10, wherein the network device is the network device in the first network; and wherein the communication unit is further configured to send second information to the network device in the first network, wherein the second information comprises third resource information to indicate random access resources of the network device in the second network, and/or to indicate a part of the random access resources selected by the communication apparatus from the random access resources.

14. The apparatus according to claim 13, wherein the communication unit is further configured to:

receive third information sent by the network device in the first network, wherein the third information is used to indicate a first time unit in which the network device in the first network does not perform scheduling; and the first time unit comprises all or some time units corresponding to the random access resources or the part of the random access resources; and send a random access request to the network device in the second network in the first time unit.

15. The apparatus according to claim 10, wherein the network device is the network device in the first network, and wherein the communication unit is further configured to send fourth information to the network device in the first network, wherein the fourth information comprises fourth resource information to indicate a resource that is used to transmit a random access message 3 and that is obtained by the communication apparatus from the network device in the second network.

16. The apparatus according to claim 15, wherein the communication unit is further configured to:

receive fifth information sent by the network device in the first network, wherein the fifth information is used to indicate a second time unit in which the network device in the first network does not perform scheduling, and wherein the second time unit comprises all or some time units corresponding to the resource that is used to transmit the random access message 3; and send the random access message 3 to the network device in the second network in the second time unit.

* * * * *